United States Patent
Aoki

(10) Patent No.: US 9,122,900 B2
(45) Date of Patent: Sep. 1, 2015

(54) BIOMETRIC AUTHENTICATION DEVICE AND COMPUTER READABLE, NON-TRANSITORY MEDIUM

(71) Applicant: FUJITSU LIMITED, Kawasaki-shi (JP)

(72) Inventor: Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 223 days.

(21) Appl. No.: 13/751,533

(22) Filed: Jan. 28, 2013

(65) Prior Publication Data

US 2013/0243264 A1 Sep. 19, 2013

Related U.S. Application Data

(63) Continuation of application No. PCT/JP2010/062789, filed on Jul. 29, 2010.

(51) Int. Cl.
*G06K 9/00* (2006.01)

(52) U.S. Cl.
CPC ........ *G06K 9/00006* (2013.01); *G06K 9/00013* (2013.01); *G06K 9/00912* (2013.01)

(58) Field of Classification Search
None
See application file for complete search history.

(56) References Cited

U.S. PATENT DOCUMENTS

| | | | |
|---|---|---|---|
| 6,038,315 A * | 3/2000 | Strait et al. | 713/183 |
| 6,570,566 B1 * | 5/2003 | Yoshigahara | 345/427 |
| 7,742,626 B2 * | 6/2010 | Kamata et al. | 382/115 |
| 7,995,808 B2 * | 8/2011 | Rowe et al. | 382/124 |
| 8,184,866 B2 * | 5/2012 | Takaku et al. | 382/115 |
| 8,264,325 B2 * | 9/2012 | Fukuda et al. | 340/5.82 |
| 8,270,680 B2 * | 9/2012 | Manabe et al. | 382/115 |
| 8,355,545 B2 * | 1/2013 | Corcoran et al. | 382/124 |
| 8,472,679 B2 * | 6/2013 | Abiko et al. | 382/115 |
| 8,509,559 B2 * | 8/2013 | Yang et al. | 382/255 |
| 8,538,088 B2 * | 9/2013 | Hama et al. | 382/115 |
| 8,565,494 B2 * | 10/2013 | Fukuda et al. | 382/115 |
| 8,600,123 B2 * | 12/2013 | Abramovich et al. | 382/124 |
| 8,781,181 B2 * | 7/2014 | Rowe et al. | 382/124 |
| 8,831,297 B2 * | 9/2014 | Rowe et al. | 382/124 |
| 8,842,155 B2 * | 9/2014 | Border et al. | 348/14.02 |

(Continued)

FOREIGN PATENT DOCUMENTS

| | | |
|---|---|---|
| JP | 6-36025 | 2/1994 |
| JP | 2000-354257 | 12/2000 |

(Continued)

OTHER PUBLICATIONS

International Search Report of Corresponding PCT Application PCT/JP2010/062789 mailed Aug. 24, 2010.

(Continued)

*Primary Examiner* — Chan Park
*Assistant Examiner* — Iman K Kholdebarin
(74) *Attorney, Agent, or Firm* — Staas & Halsey LLP

(57) ABSTRACT

A biometric authentication device includes a biometric sensor that obtains an image of a biometric authentication portion of a user without contacting, a distance sensor that obtains a distance between the biometric sensor and the biometric authentication portion, and a guidance image display unit that shows a guidance image for guiding the biometric authentication portion to a distance that is appropriate for the biometric sensor to obtain the biometric authentication portion, the guidance image changing continuously or in stages according to the distance obtained by the distance sensor.

14 Claims, 23 Drawing Sheets

(56) References Cited

U.S. PATENT DOCUMENTS

| | | | |
|---|---|---|---|
| 8,855,378 B2* | 10/2014 | Fukuda et al. | 382/115 |
| 8,866,889 B2* | 10/2014 | Masalkar et al. | 348/46 |
| 2005/0148876 A1* | 7/2005 | Endoh et al. | 600/454 |
| 2005/0185827 A1* | 8/2005 | Kono et al. | 382/124 |
| 2006/0023919 A1* | 2/2006 | Okamura et al. | 382/115 |
| 2008/0031495 A1* | 2/2008 | Saijo et al. | 382/115 |
| 2008/0107309 A1* | 5/2008 | Cerni | 382/115 |
| 2008/0298645 A1* | 12/2008 | Doi | 382/118 |
| 2009/0091531 A1* | 4/2009 | Hama et al. | 345/157 |
| 2009/0116706 A1* | 5/2009 | Hauke | 382/126 |
| 2009/0220128 A1* | 9/2009 | Irimoto et al. | 382/118 |
| 2009/0245591 A1* | 10/2009 | Rowe et al. | 382/115 |
| 2012/0249423 A1* | 10/2012 | Matsumoto et al. | 345/158 |
| 2012/0250947 A1* | 10/2012 | Abramovich et al. | 382/115 |
| 2012/0257046 A1* | 10/2012 | Mueller et al. | 348/135 |
| 2013/0005443 A1* | 1/2013 | Kosta et al. | 463/25 |
| 2013/0063345 A1* | 3/2013 | Maeda | 345/156 |
| 2013/0162799 A1* | 6/2013 | Hanna et al. | 348/78 |
| 2014/0044323 A1* | 2/2014 | Abramovich et al. | 382/124 |
| 2014/0098998 A1* | 4/2014 | Sharma et al. | 382/104 |
| 2014/0118519 A1* | 5/2014 | Sahin | 348/77 |
| 2014/0212008 A1* | 7/2014 | Hatcher et al. | 382/124 |
| 2014/0253711 A1* | 9/2014 | Balch et al. | 348/77 |
| 2014/0270404 A1* | 9/2014 | Hanna et al. | 382/116 |

FOREIGN PATENT DOCUMENTS

| | | |
|---|---|---|
| JP | 2006-42880 | 2/2006 |
| JP | 2007-236668 | 9/2007 |
| JP | 2007-319175 | 12/2007 |
| JP | 2008-310480 | 12/2008 |
| WO | WO 2007/141860 A1 | 12/2007 |

OTHER PUBLICATIONS

Japanese Office Action dated Sep. 9, 2014 in corresponding Japanese Patent Application No. 2012-526249.

* cited by examiner

FIG. 2A

| DISTANCE | IMAGE |
|---|---|
| $D_1$ | GUIDANCE IMAGE 1 |
| $D_2$ | GUIDANCE IMAGE 2 |
| ⋮ | ⋮ |
| $D_k$ | REFERENCE IMAGE |
| ⋮ | ⋮ |
| $D_{n-1}$ | GUIDANCE IMAGE n-1 |
| $D_n$ | GUIDANCE IMAGE n |

FIG. 2B

| ID | DISTANCE DURING AUTHENTICATION |
|---|---|
| 0001 | $D_{0001}$ |
| 0002 | $D_{0002}$ |
| ⋮ | ⋮ |

CLOSE

APPROPRIATE

FAR

CLOSE

APPROPRIATE

FAR

CLOSE

APPROPRIATE

FAR

CLOSE

APPROPRIATE

FAR

CLOSE

APPROPRIATE

FAR

LARGELY OFF

OFF

APPROPRIATE DISTANCE

X-DIRECTION

X-DIRECTION

X-DIRECTION

BIOMETRIC AUTHENTICATION DEVICE AND COMPUTER READABLE, NON-TRANSITORY MEDIUM

CROSS-REFERENCE TO RELATED APPLICATION

This application is a continuation application of PCT/JP2010/62789 filed on Jul. 29, 2010, the contents of which are herein wholly incorporated by reference

FIELD

A certain aspect of embodiments described herein relates to a biometric authentication device and a computer readable medium.

BACKGROUND

Biometric authentication is a technology for identifying an individual based on a biometric feature of a person (a vein pattern or the like). In the biometric authentication, a feature data of an individual is registered as a registered data in advance. In an authentication process for determining whether an objective person is an identical person, a feature data obtained by a sensor such as a camera is compared with a registered data. In concrete, a similarity indicating a degree how both data are similar with each other is calculated. When the similarity is more than a given threshold, it is determined that the objective person is the identical person.

The biometric authentication is used in various fields needing identification. For example, the biometric authentication is used in an ATM (Automated Teller Machine), an entering and leaving administration in addition to a logon administration of a personal computer.

Various features in addition to a finger print, a sound and a face can be used as the biometric feature used in the biometric authentication. For example, a vein pattern of a palm or the like can be used. In a vein authentication, a vein image inside of a biometric body is obtained with use of a near-infrared light camera, and the obtained image is used as the biometric feature. The vein authentication uses information inside of a biometric body, and thereby has a merit that a feature is difficult to steal.

Recently, a biometric authentication without contacting such as the vein authentication is focused. Non-contacting authentication is an authentication enabling identification without contacting of a user to an authentication device. The non-contacting authentication reduces a psychological burden from a hygiene viewpoint in a public place. The non-contacting authentication does not need a guide device for fixing a biometric body of a user, and has a merit of downsizing an authentication device.

It is necessary for a user to put his or her hand close to an authentication device with a correct distance. Therefore, it is necessary for a beginner to get used to the non-contacting authentication. And so, Japanese Patent Application Publication No. 2006-042880 discloses a technology in which a guidance image is shown when an imaging of a biometric body is failed.

SUMMARY

According to an aspect of the present invention, there is provided a biometric authentication device including a biometric sensor that obtains an image of a biometric authentication portion of a user without contacting, a distance sensor that obtains a distance between the biometric sensor and the biometric authentication portion, and a guidance image display unit that shows a guidance image for guiding the biometric authentication portion to a distance that is appropriate for the biometric sensor to obtain the biometric authentication portion, the guidance image changing continuously or in stages according to the distance obtained by the distance sensor.

According to an aspect of the present invention, there is provided a computer readable medium storing a program that causes a computer to execute a process, the process including obtaining a distance between a biometric sensor obtaining an image of a biometric authentication portion of a user without contacting and the biometric authentication portion, and showing a guidance image for guiding the biometric authentication portion to a distance that is appropriate for the biometric sensor to obtain the biometric authentication portion, the guidance image changing continuously or in stages according to the distance obtained by the distance sensor.

BRIEF DESCRIPTION OF DRAWINGS

FIG. 2A and FIG. 2B illustrate a table;

DESCRIPTION OF EMBODIMENTS

A description will be given of embodiments with reference to drawings.

First Embodiment

Figure 1:
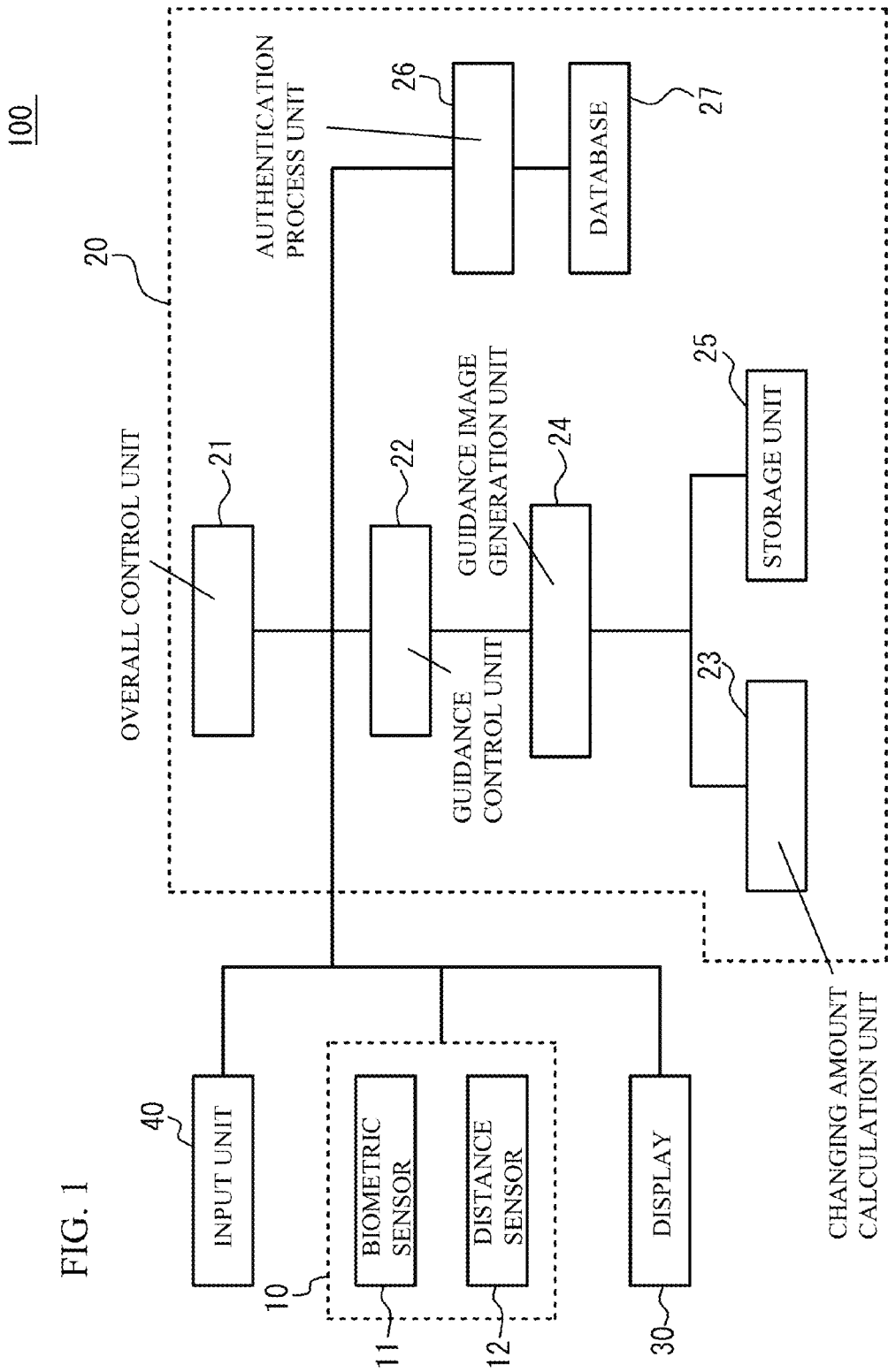
FIG. 1 illustrates a function block diagram for describing an overall structure of a biometric authentication device.

FIG. 1 illustrates a function block diagram for describing an overall structure of a biometric authentication device 100. As illustrated in FIG. 1, the biometric authentication device 100 has an authentication sensor 10, a processor 20, a display 30, and an input unit 40. The authentication sensor 10 has a biometric sensor 11 and a distance sensor 12. The processor 20 has an overall control unit 21, a guidance control unit 22, a changing amount calculation unit 23, a guidance image generation unit 24, a storage unit 25, an authentication process unit 26 and a database 27.

The biometric sensor 11 is a non-contact sensor for capturing an image of a biometric authentication portion of a user. The biometric sensor 11 is, for example, a vein authentication sensor and has a CMOS (Complementary Metal Oxide Semiconductor), a CCD (Charge Coupled Device) or the like as an imaging element. The biometric sensor 11 has a near-infrared light LED (Light Emitting Diode) as an illumination lamp for illuminating an object. The distance sensor 12 is a distance sensor for obtaining a distance between the biometric sensor 11 and a biometric authentication portion of a user. The location of the distance sensor 12 is not limited. The distance sensor 12 may be located around the biometric sensor 11. It is possible to select from a method of obtaining a distance from intensity of a reflection light from an object to which a light is radiated, a triangulate method of obtaining a distance from a spot position obtained by radiation of a beam light, and so on. In view of a principle of a distance sensor (reflectivity), an infrared-irradiation unit regularly mounted on a vein authentication device may be used.

The overall control unit 21 obtains an image from the biometric sensor 11, obtains a distance from the distance sensor 12, and controls each unit of the biometric authentication device 100. The guidance control unit 22 controls a whole of guidance process for guiding a user so that a distance between a biometric authentication portion of a user and the biometric sensor 11 is within an appropriate range. The changing amount calculation unit 23 is a calculator for calculating an image-changing amount according to the distance between the biometric sensor 11 and the biometric authentication portion. The guidance image generation unit 24 generates a guidance image obtained by changing a reference image for guidance according to the image-changing amount calculated by the changing amount calculation unit 23 and outputs the guidance image to the display 30.

The storage unit 25 stores the reference image, and stores the guidance image generated by the guidance image generation unit 24. The storage unit 25 acts as a cash for reducing calculation amount by re-using the guidance image stored in the storage unit 25. The guidance image may be generated in advance before an authentication process. The storage unit 25 also may store the generated guidance image. For example, the storage unit 25 may have a table of FIG. 2A including a relation between the stored reference image, the stored guidance image and the distance between the biometric sensor 11 and the biometric authentication portion. In this case, the display 30 may show an image according to the distance obtained by the distance sensor 12.

The authentication process unit 26 performs a biometric authentication process. In concrete, the authentication process unit 26 calculates a similarity between an image data obtained by the biometric sensor 11 and a registered data that is registered in the database 27. The database 27 stores registered data including biometric features of each user obtained by the biometric sensor 11 in advance. The database 27 may store a distance between the biometric sensor 11 and a biometric authentication portion when the registered data is generated. The database 27 may store a similarity of each biometric authentication and a distance between the biometric sensor 11 and the biometric authentication portion as an authentication history. For example, the database 27 may store a table including a relation between the distance between the biometric sensor 11 and the biometric authentication portion and an ID input by the input unit 40. FIG. 2B illustrates an example of the table. In this case, an appropriate authentication distance with respect to an individual can be used as a target distance.

The display 30 shows a guidance image output by the guidance image generation unit 24. The input unit 40 is a device for inputting an ID or a password by a user, and is a keyboard or the like. There are two types of biometric authentication method including one to one authentication in which an individual is authenticated after the individual is identified by inputting of an ID and one to N authentication in which an individual is directly identified with use of biometric information without inputting of an ID. The present invention can be applied to both of the one to one authentication and the one to N authentication. The input unit 40 is used when an ID is input during the one to one authentication.

Figure 3:
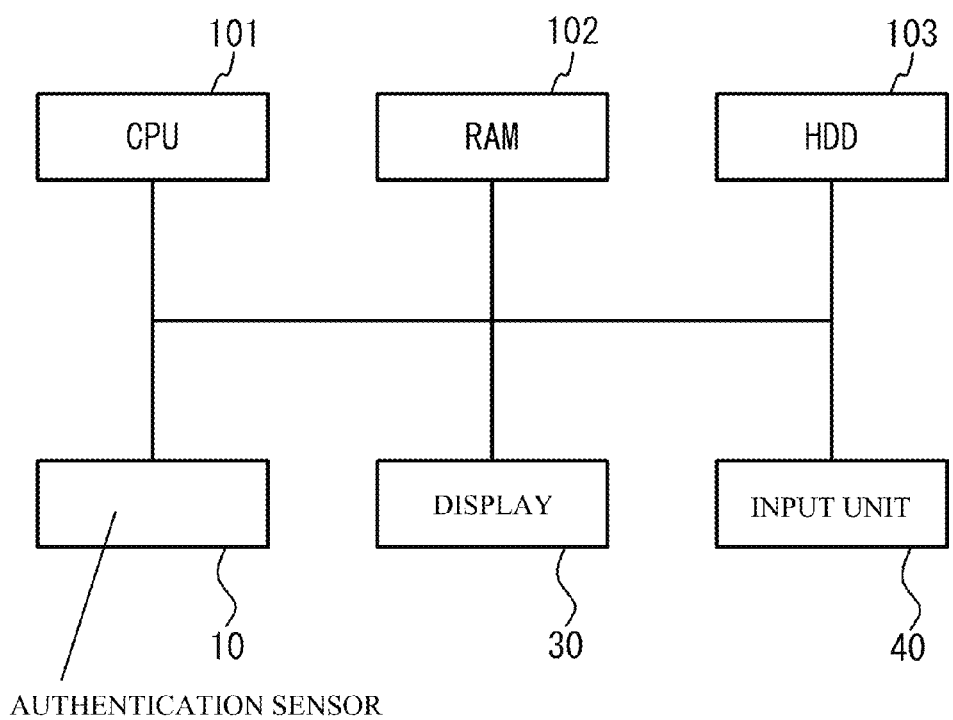
FIG. 3 illustrates a component structure diagram of the biometric authentication device.

FIG. 3 illustrates a component structure diagram of the biometric authentication device 100. As illustrated in FIG. 3, the biometric authentication device 100 has a CPU (Central Processing Unit) 101, a RAM (Random Access Memory) 102, a HDD (Hard Disk Drive) 103, the authentication sensor 10, the display 30, the input unit 40 and so on. Each component is connected to each other through a bus. When the CPU 101 executes a biometric authentication program stored in the HDD 103 or the like, the processor 20 of FIG. 1 is established in the biometric authentication device 100.

(Generation of registered data) Next, a description will be given of a registration process of a registered data to the database 27. The overall control unit 21 gives an instruction to the authentication process unit 26 to generate a registered data. The biometric sensor 11 obtains a palm vein image of a user. The authentication process unit 26 extracts a vein feature from the obtained vein image and generates a registered data. The generated registered data is related to an ID input by the input unit 40 and is stored in the database 27.

Figure 4:
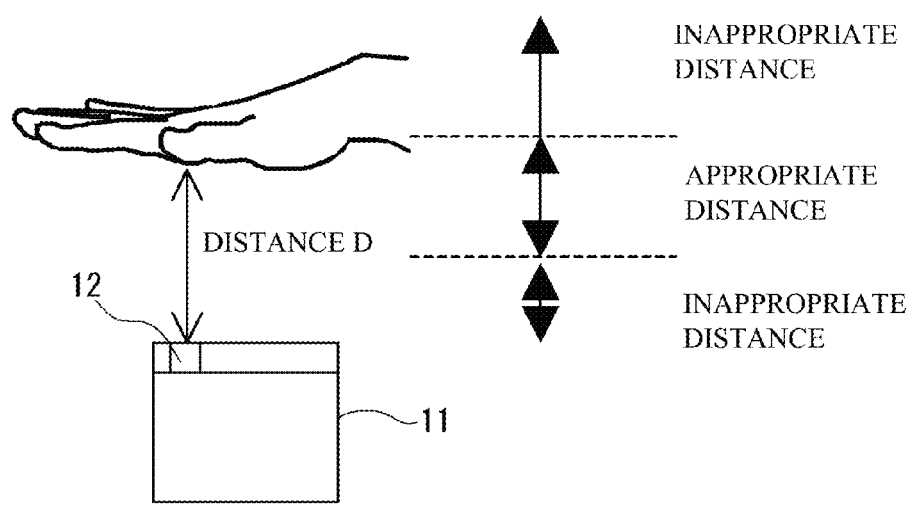
FIG. 4 illustrates a distance between a biometric sensor and an authentication portion.

(Generation of guidance image) Next, a description will be given of a generation process of a guidance image for guiding a distance between an authentication portion of a user and the biometric sensor 11 to an appropriate range. The user keeps his or her palm at a position spaced from the biometric sensor 11 during a login process or a starting process. FIG. 4 illustrates a distance between the biometric sensor 11 and the authentication portion (palm). When a vein image is obtained by the biometric sensor 11, it is preferable that an authentication distance is within an appropriate range.

The overall control unit 21 gives an instruction to the guidance control unit 22 to generate and show a guidance image. The distance sensor 12 obtains a distance between the biometric sensor 11 and the biometric authentication portion (hereinafter referred to as a measured distance D) and gives the distance D to the guidance image generation unit 24. The storage unit 25 stores a reference image I(x) for guiding in advance. The reference image I(x) may be a picture or a letter and may be different with respect to each user. The reference I(x) may be changed after used. The guidance image generation unit 24 gives the measured distance D to the changing amount calculation unit 23 and gives an instruction to the changing amount calculation unit 23 to calculate a changing amount.

The changing amount calculation unit 23 calculates a difference ΔD between a target distance $D_T$ and the measured distance D. The target distance $D_T$ is an optimal value that is appropriate for the vein authentication, and is, for example, a value within 5 cm to 10 cm. The target distance $D_T$ may be stored in the storage unit 25 in advance. When the difference ΔD is a plus value, the authentication portion is far from the biometric sensor 11. When the difference ΔD is a minus value, the authentication portion is close to the biometric sensor 11.

When the difference ΔD is zero, the changing amount calculation unit 23 determines that the changing amount of the reference image I(x) is zero and thus does not change the reference image I(x). The changing amount calculation unit 23 applies a Gaussian filter to the reference image I(x) and calculates a changing amount for a blurring, when the difference ΔD is not zero. For example, the changing amount calculation unit 23 calculates a variable number σ of a Gaussian function as an example of the changing amount. The changing amount calculation unit 23 calculates the variable number σ as a product between an absolute value |ΔD| and a proportionality coefficient α. The proportionality coefficient α may be different with respect to each device or each user.

The Gaussian function G(x) is expressed as a following formula (1). The guidance image generation unit 24 uses the Gaussian function G(x) as a filter and applies the blurring to the reference image I(x) by applying a convolution operation to the reference image I(x) in accordance with a following formula (2).

Thus, a guidance image F(x) is generated. In accordance with the following formulas (1) and (2), the larger the variable number σ is, the larger the blurring amount is, and the smaller the variable number σ is, the smaller the blurring amount is. The sign between the I(x) and G(x) of the formula (2) is a sign indicating the convolution operation.

$$G(x) = \frac{1}{\sigma\sqrt{2\pi}} \exp\left(-\frac{x^2}{2\sigma^2}\right) \quad (1)$$

$$F(x) = I(x) \otimes G(x) \quad (2)$$

In the convolution operation, an original image (in this case, the reference image I) and a filter (in this case, the Gaussian G(x)) are translated and a product-sum operation is performed. In concrete, the convolution operation is expressed as a following formula (3). In the following formula (3), x' is a translated position in an X-direction. The formulas (1) to (3) are a formula of one dimension of the X-direction. However, formulas of two dimensions of an X-direction and a Y-direction may be used.

$$F(x) = \int_{x'} I(x') \cdot G(x' - x) dx' \quad (3)$$

Figure 5:
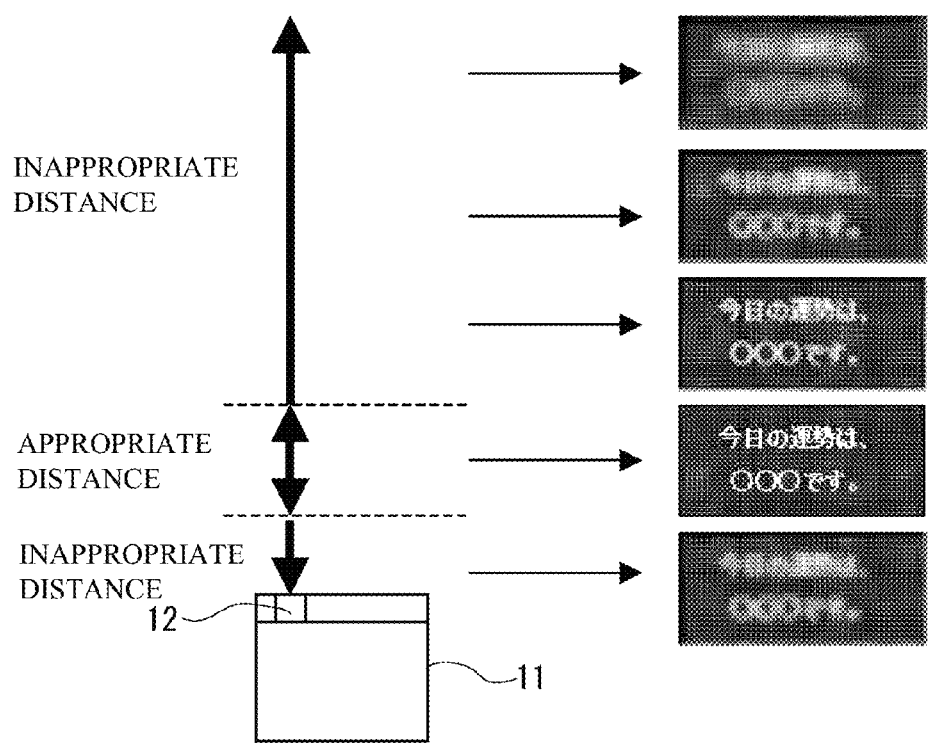
FIG. 5 visually illustrates a relation between a measured distance and a guidance image.

The guidance image F(x) generated by the guidance image generation unit 24 is stored in the storage unit 25 and is given to the display 30. The display 30 shows the guidance image F(x). FIG. 5 visually illustrates a relation between the measured distance D and the guidance image F(x). As illustrated in FIG. 5, when the measured distance D is within an appropriate range, the guidance image F(x) is clear. When the measured distance D is out of the appropriate range, the guidance image F(x) gets unclear. The farther the measured distance D is from the appropriate range, the larger the blurring amount of the guidance image F(x) is. The user can visually realize whether the distance between the biometric authentication portion and the biometric sensor 11 is appropriate or not by watching the guidance image shown by the display 30. Thus, the biometric authentication portion is kept at a position that is preferable for the biometric sensor 11.

(Authentication Process) When the measured distance D is within an allowable range, the overall control unit 21 gives an instruction to the authentication process unit 26 to start an authentication process. The authentication process unit 26 gives an instruction to the biometric sensor 11 to obtain a biometric image (a palm vein image). Thus, the biometric sensor 11 obtains a biometric image and gives the biometric image to the authentication process unit 26. The authentication process unit 26 extracts features from the biometric image and generates a match data. Next, the authentication process unit 26 calculates a similarity between the match data and a registered data stored in the database 27. When the calculated similarity is a predetermined value or more, the authentication process unit 26 determines that the authentication is succeeded, and allows a login.

When an ID is required at the login, the authentication process unit 26 calculates a similarity between the match data and a registered data related to an ID input from the input unit 40.

Figure 6:
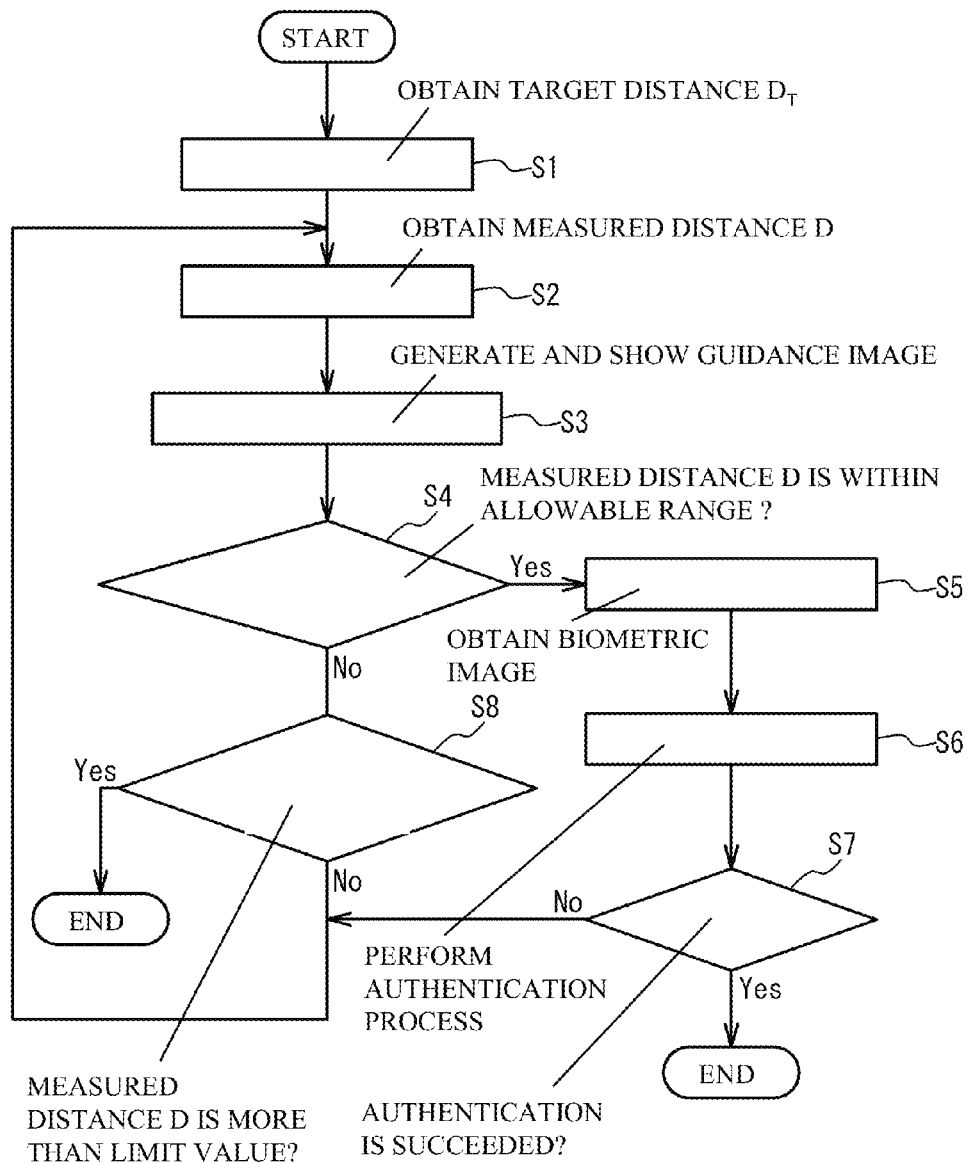
FIG. 6 illustrates an example of a flowchart executed during a guidance image generation process and an authentication process.

FIG. 6 illustrates an example of a flowchart executed during the guidance image generation process and the authentication process. The overall control unit 21 controls each unit in accordance with the flowchart of FIG. 6. The changing amount calculation unit 23 obtains a target distance $D_T$ from the storage unit 25 (Step S1). Next, the changing amount calculation unit 23 receives a detection result of the distance sensor 12 and obtains a measured distance D (Step S2). Next, the changing amount calculation unit 23 calculates a changing amount according to a difference ΔD (=D-$D_T$). The guidance image generation unit 24 generates a guidance image F(x) in accordance with the changing amount calculated by the changing amount calculation unit 23. Thus, the display 30 shows the guidance image F(x) (Step S3). The Step S3 may be omitted if the authentication portion is kept at an appropriate distance.

Next, the guidance control unit 22 determines whether the measured distance D is within an allowable range (Step S4). If it is determined as "Yes" in the Step S4, the biometric sensor 11 obtains a biometric image of a user (Step S5). Next, the authentication process unit 26 performs an authentication process (Step S6). Next, the authentication process unit 26 determines whether an authentication is succeeded (Step S7). If it is determined as "No" in the Step S7, the Steps S2 through S4 are executed again. If it is determined as "Yes" in the Step S7, the flowchart is terminated.

If it is determined as "No" in the Step S4, the changing amount calculation unit 23 determines whether the measured distance D is more than a limit value (Step S8). The limit value is a value for determining whether the user stops laying his or her palm. The limit value may be a detection limit of the distance sensor 12 or a given threshold. If it is determined as "Yes" in the Step S8, the flowchart is terminated. Thus, unnecessary controls are not performed. If it is determined as "No" in the Step S8, the Steps S2 through S4 are executed again.

It is well known that a camera is out of focus when the distance of an object is inappropriate during shooting with the camera. In accordance with the embodiment, the user is capable of naturally adjusting the position of the biometric authentication portion like focusing a camera. That is, an inherent process of "adjusting a distance to an appropriate distance"→"capable of authentication" is replaced to a well known process of "adjusting a distance to an appropriate distance"→"focusing a point (a guidance image)". Thus, the user is capable of visually adjusting the distance.

Figure 7:
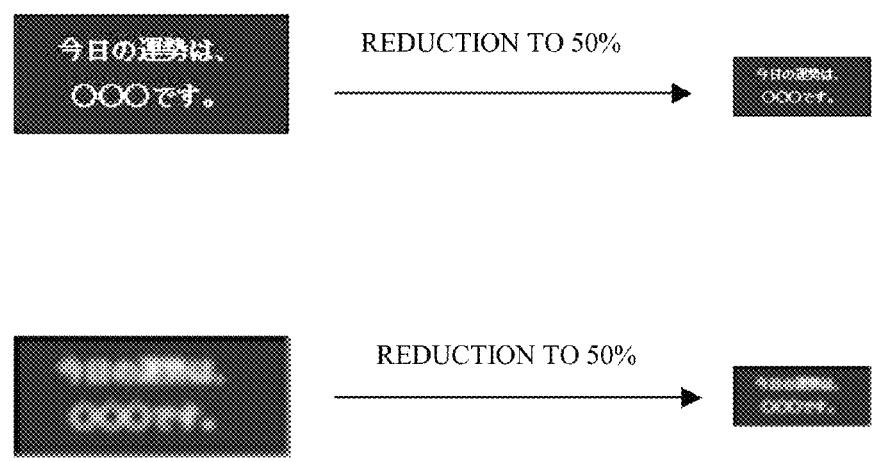
FIG. 7 illustrates an effect of a blurring process.

In the method using the blurring process in accordance with the embodiment of FIG. 7, the distance is fed back in accordance with the blurring amount applied to an image. Therefore, the user is capable of maintaining a constant sense that is independent of an apparent size in the display. That is, even if the display size of the display gets smaller, the blurring amount of the image is identical. Therefore, the user is capable of keeping an identical usability without relying on the size in the display.

There are various methods as the method of guiding the distance other than the embodiment. For example, there is a method of directly guiding the distance with use of sound. However, in the guidance method with use of the sound, there is a problem that it is difficult to guide the distance appropriately, because the guidance method with use of the sound lacks of real time performance. For example, even if an instruction "please close your palm by five centimeters" is given with use of a sound, the palm may move during understanding the instruction. Therefore, an appropriate feedback is difficult. On the other hand, it is possible to feed back in real time in the embodiment.

Modified Embodiment 1-1

Figure 8:
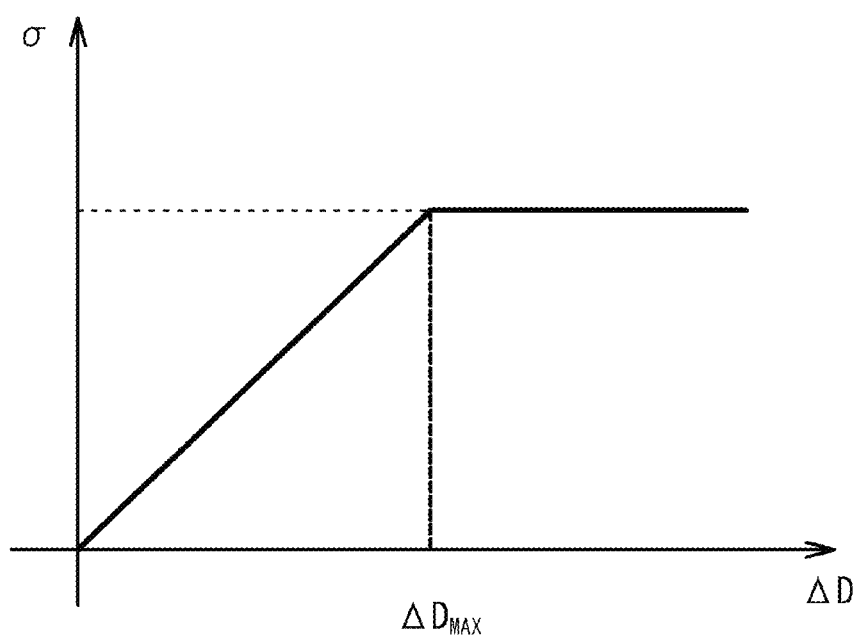
FIG. 8 illustrates a relation between a difference $\Delta D$ and a variable number $\sigma$.

A maximum value is not set with respect to the difference $\Delta D$ and the variable number $\sigma$ in the above-mentioned embodiment. However, a maximum value $\Delta D_{Max}$ may be set with respect to the difference $\Delta D$, and a maximum value $a_{Max}$ may be set with respect to the variable number $\sigma$. In this case, when the difference $\Delta D$ is more than the maximum value $\Delta D_{Max}$, $\sigma$ is $\sigma_{Max}$. The variable number $\sigma$ may be expressed as a following formula (4) with use of the maximum value $\sigma_{Max}$ and the maximum value $\Delta D_{Max}$. In this case, as illustrated in FIG. 8, when the difference $\Delta D$ is zero, the variable number $\sigma$ is zero. And when $|\Delta D|$ is $|\Delta D_{Max}|$, $\sigma$ is $\sigma_{Max}$. When the difference $\Delta D$ is a minus value, the same process may be performed.

$$\sigma = \sigma_{Max} \cdot (|\Delta D|/|\Delta D_{Max}|) \quad (4)$$

Modified Embodiment 1-2

The changing amount of the variable number $\sigma$ may be changed in accordance with the sign of the difference $\Delta D$. For example, when the difference $\Delta D$ is a minus value, the biometric authentication portion is close to the biometric sensor 11. Generally, in an imaging device with use of an illumination lamp, a diffusion degree of the illumination lamp tends to be small at a close distance. In the vein authentication, a near-infrared illumination lamp is used. Therefore, the illumination lamp is uneven when the distance is excessively close. Therefore, a bad influence is on the authentication accuracy. When an object is close, a distortion caused by a lens is generally large, and has an influence on the authentication accuracy. Therefore, when the object is closer than a predetermined distance, the variable number $\sigma$ may rapidly get close to the maximum value $\sigma_{Max}$.

And, for example, the maximum value $\Delta D_{Max}$ may be changed in accordance with a sign of the difference $\Delta D$. On the other hand, when the difference $\Delta D$ is a plus value, the biometric authentication portion is far from the biometric sensor 11. In this case, the influence on the authentication accuracy is relatively small. Therefore, the variable number $\sigma$ may get closer to the maximum value $\sigma_{Max}$ moderately. A proportionality coefficient may be changed to a different value instead of changing the maximum value $\Delta D_{Max}|$.

Modified Embodiment 1-3

In the above-mentioned embodiment, the target distance $D_T$ is a predetermined single value. However, the target distance $D_T$ may have a range. For example, the target distance $D_T$ may be a value having a range of 5 cm to 10 cm. In this case, the difference $\Delta D$ may be a difference between a limit value of the range and the measured distance D. For example, when the biometric authentication portion is far from the biometric sensor 11, the difference $\Delta D$ may be a difference between an upper limit of the range and the measured distance D. When the biometric authentication portion is close to the biometric sensor 11, the difference $\Delta D$ may be a difference between a lower limit of the range and the measured distance D.

Modified Embodiment 1-4

The difference $\Delta D$ may be subjected to a rounding process. The rounding process is a process treating a distance having a given range of a unit "d" (for example 5 mm) as a constant value. With the rounding process, the reference image $I(x)$ changes in stages with respect to the measured distance D. In this case, the number of calculation is reduced.

Modified Embodiment 1-5

A necessary guidance image may be generated pseudoly with use of a generated guidance image stored in the storage unit 25. For example, when a guidance image $F_1(x)$ with respect to a difference $\Delta D_1$ and a guidance image $F_2(x)$ with respect a difference $\Delta D_2$ are generated in advance, a guidance image $F_3(x)$ with respect to a difference $\Delta D_3$ may be generated from the guidance image $F_1(x)$ and the guidance image $F_2(x)$. For example, when $\Delta D_1 < \Delta D_3 < \Delta D_2$, the guidance image $F_3(x)$ may be generated in accordance with a following formula (5). A coefficient $\alpha_1$ and a coefficient $\alpha_2$ are expressed as following formulas (6) and (7).

$$F_3(x) = \alpha_1 F_1(x) + \alpha_2 F_2(x) \quad (5)$$

$$\alpha_1 = (\Delta D_2 - \Delta D_3)/(\Delta D_2 - \Delta D_1) \quad (6)$$

$$\alpha_2 = (\Delta D_3 - \Delta D_1)/(\Delta D_2 - \Delta D_1) \quad (7)$$

Modified Embodiment 1-6

The guidance image generation unit 24 may make the guidance image include the reference image $I(x)$. In this case, the user is capable of determining whether the biometric authentication portion is held at an appropriate position through a comparison between the reference image $I(x)$ and the guidance image in which the reference image $I(x)$ is modified. That is, the user is capable of using the reference image $I(x)$ as a target for comparison.

Modified Embodiment 1-7

The above-mentioned formulas (1) and (2) may take long time for calculation. And so, a convolution theorem may be used instead of the convolution operation. In the convolution theorem, a product between a Fourier transform function I'(k) of the reference image I(x) and a Fourier transform function G'(k) of the Gaussian function G(x) is calculated. When an obtained result is subjected to an inverse Fourier transform, a desirable image is obtained.

The Fourier transform function G'(k) of the Gaussian function G(x) is analytically known. Therefore, the Fourier transform function G'(k) can be calculated easily. In concrete, the guidance image generation unit 24 generates an image G'(k) in a frequency space of Gaussian expressed as a following formula (8) with respect to the variable number σ calculated by the changing amount calculation unit 23. Next, the guidance image generation unit 24 calculates a product between the Fourier transform function I'(k) of the reference image I(x) and the image G'(k) in accordance with a following formula (9). The guidance image generation unit 24 obtains a desirable guidance image F(x) by performing an inverse Fourier transform with respect to the obtained image F'(k). With the method, a calculation time is identical independently of the variable number σ.

$$G'(k) = \exp(-2\pi^2 \sigma^2 k^2) \tag{8}$$

$$I'(k) \cdot G'(k) = F'(k) \tag{9}$$

Modified Embodiment 1-8

When the reference image I(x) is a color image, the blurring process is performed with respect to a specific color component. For example, when a color image is subjected to the blurring process, it is necessary to calculate each of RGB in general. In contrast, the color image may be transformed into a YCbCr color space or a YUV color space, and only Y component may be subjected to the blurring process. A transformation formula with respect to the YCbCr of RGB is expressed as following formulas (10) to (12). The formulas (10) to (12) are transformation formulas of a color space of ITU-R BT. 601.

$$Y = 0.29891 \times R + 0.58661 \times G + 0.11448 \times B \tag{10}$$

$$Cb = -0.16874 \times R - 0.33126 \times G + 0.50000 \times B \tag{11}$$

$$Cr = 0.50000 \times R - 0.41869 \times G - 0.08131 \times B \tag{12}$$

An eye of a human acutely responds to a brightness component Y. However a color component does not have a large influence on the eye. Therefore, an influence on an eye is suppressed and a calculation amount can be reduced, when only the Y component is subjected to the blurring process.

In the above embodiment, the blurring process is used as a process for changing the reference image I(x). However the process is not limited. A description will be given of other processes for changing the reference image I(x).

Modified Embodiment 1-9

Figure 9A:
FIGS. 9A, 9B, and 9C illustrate a changing of a shape of a figure.
Figure 9B:
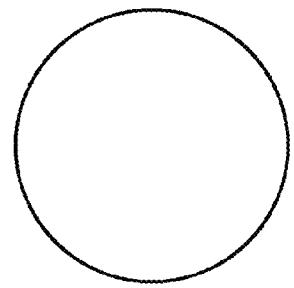
Figure 9C:

A precise circle may be used as the reference image I(x), and the precise circle may be changed into an ellipse according to the difference ΔD. For example, as illustrated in FIG. 9B, when the measured distance D is within an appropriate range, the guidance image generation unit 24 uses the precise circle as a guidance image. As illustrated in FIG. 9A, when the measured distance D is small because the biometric authentication portion is close to the biometric sensor 11, the guidance image generation unit 24 uses a horizontally long ellipse as the guidance image. As illustrated in FIG. 9C, when the measured distance D is large because the biometric authentication portion is far from the biometric sensor 11, the guidance image generation unit 24 uses a vertically long ellipse as the guidance image. In this case, the user is capable of naturally adjusting the position of the biometric authentication portion like focusing a point. That is, an intuitive guidance of a biometric authentication portion can be achieved.

A formula of an ellipse can be expressed as a following formula (13). In the following formula (13), parameters "a" and "b" indicate a shape of an ellipse. When a>b>0, an ellipse is changed into a horizontally long ellipse. When b>a>0, the ellipse is changed into a vertically long ellipse. It is possible to relate the relation with the difference ΔD. The area S of the ellipse can be expressed as S=πab. That is, it is possible to change a shape of an ellipse with the area being kept constant, when a condition that a product between "a" and "b" is constant. Here, a description will be given of a case where the difference ΔD is a minus value (a biometric authentication portion is close to the biometric sensor 11).

$$\left(\frac{x}{a}\right)^2 + \left(\frac{y}{b}\right)^2 = 1 \tag{13}$$

A maximum value and a minimum value of the changing parameter "a" are $a_{Max}$ and $a_{Min}$ ($a_{Max} > a_{Min} > 0$). Here, when a condition that the change in the X-axis is symmetrically on the change in the Y-axis is set (the changing range of "a" is equal to that of "b"), it is required that a condition that $a_{Max} \times a_{Min}$ is C is satisfied. Therefore, if the $a_{Max}$ is determined, the $a_{Min}$ is automatically determined. The changing amount calculation unit 23 relates the difference ΔD with the parameter "a" in accordance with a following formula (14).

$$a = (a_{Max} - a_{min}) \cdot (|\Delta D| / |\Delta D_{Max}|) + a_{min} \tag{14}$$

Modified Embodiment 1-10

Figure 10A:
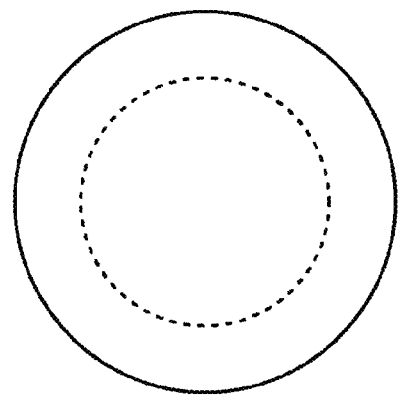
FIGS. 10A, 10B, and 10C illustrate a changing of a shape of a figure.
Figure 10B:
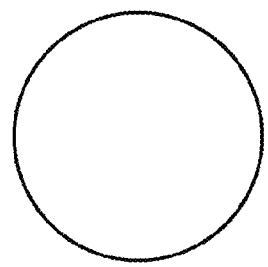
Figure 10C:
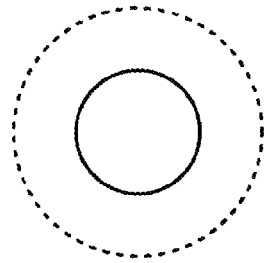

A target circle for comparison may be shown as the reference image I(x), and a radius of a circle for guidance of which center is the same as the target circle may be changed according to the difference ΔD. For example, as illustrated in FIG. 10A, when the biometric authentication portion is close to the biometric sensor 11 and the measured distance D is small, the guidance image generation unit 24 may use the target circle and a circle of which radius is larger than that of the target circle as a guidance image. As illustrated in FIG. 10C, when the biometric authentication portion is far from the biometric sensor 11 and the measured distance D is large, the guidance image generation unit 24 uses the target circle and a circle of which radius is smaller than that of the target circle as the guidance image. In FIG. 10A and FIG. 10C, the target circle is illustrated with a dotted line. As illustrated in FIG. 10B, when the measured distance D is within an appropriate range, the guidance image generation unit 24 may set the radius of the circles to be the same and may use the circles as the guidance image. In this case, the user is capable of naturally adjusting the position of the biometric authentication portion like focusing a point. That is, the intuitive guidance of the biometric authentication portion can be achieved. In the modified embodiment, the reference Image I(x) acts as the target image for comparison. However, the modified embodiment is also an example of the modified embodiment 1-6.

When the radius of the target circle for comparison is expressed as "$r_0$" and the radius of the circle of which radius is changed is expressed as "r", "r" can be changed according to the measured distance D by setting the "r" in accordance with a following formula (15).

$$r = r_0 \cdot (D/D_T) \tag{15}$$

Modified Embodiment 1-11

Figure 11A:
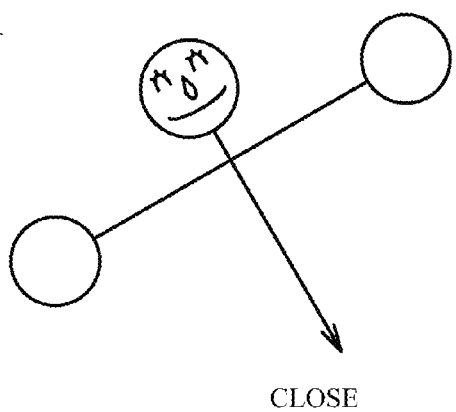
FIGS. 11A, 11B, and 11C illustrate a changing of an angle of a figure.
Figure 11B:
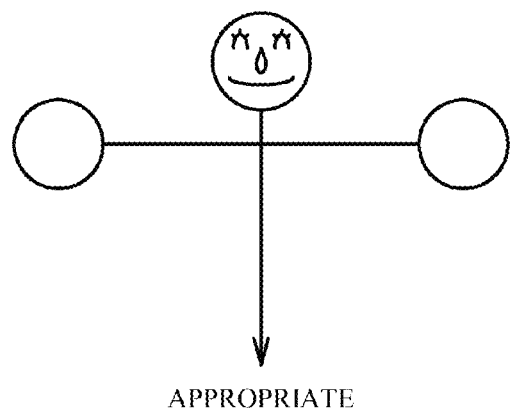
Figure 11C:
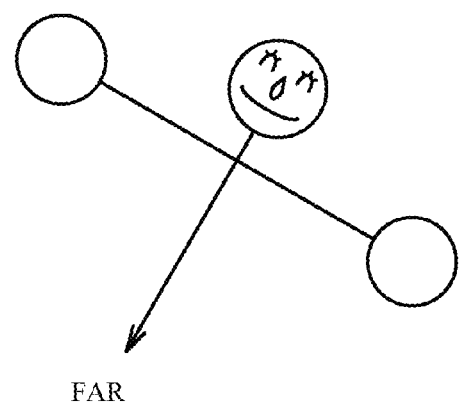

The guidance image may be generated by rotating the reference image I(x) in accordance with the difference ΔD. For example, as illustrated in FIG. 11B, when the measured distance D is within an appropriate range, the guidance image generation unit 24 does not rotate the reference image I(x). As illustrated in FIG. 11A, when the biometric authentication portion is close to the biometric sensor 11 and the measured distance D is small, the guidance image generation unit 24 may use the reference image I(x) rotated toward left as a guidance image. As illustrated in FIG. 11C, when the biometric authentication portion is far from the biometric sensor 11 and the measured distance D is large, the guidance image generation unit 24 may use the reference image I(x) rotated toward right as the guidance image. In this case, the user is capable of naturally adjusting the position of the biometric authentication portion like focusing a point. That is, the intuitive guidance of the biometric authentication portion can be achieved.

For example, a coordinate of an image is expressed as (x, y), a coordinate (x', y') after rotation can be expressed as a following formula (16). In the formula (16), a rotation angle "θ" can be changed according to the difference ΔD in accordance with the formula (17).

$$\begin{pmatrix} x' \\ y' \end{pmatrix} = \begin{pmatrix} \cos\theta & -\sin\theta \\ \sin\theta & \cos\theta \end{pmatrix} \begin{pmatrix} x \\ y \end{pmatrix} \tag{16}$$

$$\theta = 2\pi \cdot \frac{D - D_T}{D_T} \tag{17}$$

Modified Embodiment 1-12

The reference image I(x) may be subjected to an affine transform process. The affine transform can be expressed as following formulas (18) and (19). The affine transform combines a scaling, a rotation, a parallel movement, a reversing and so on of an image into a single formula. The guidance image generation unit 24 may generate a guidance image by arbitrarily adjusting parameters "a", "b", "c", "d", "e" and "f" in accordance with the difference ΔD.

$$x' = ax + by + c \tag{18}$$

$$y' = dx + ey + f \tag{19}$$

The affine transform acts as a transform of the scaling when a=e, and b=c=d=f=0. In this case, when the parameter "a" is adjusted, the same result as the embodiment in which the radius of the reference image is changed can be obtained. The affine transform acts as a transform of the rotating when a=e, b=−d, $a^2+b^2=1$, and c=f. Therefore, the same result as the embodiment in which the reference image is rotated can be obtained.

Modified Embodiment 1-13

Figure 12A:
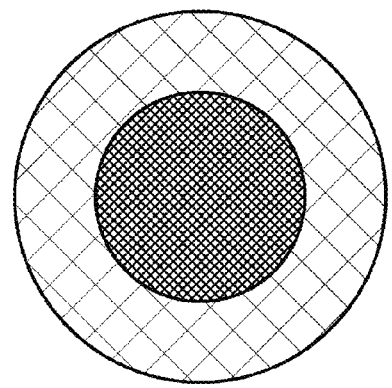
FIGS. 12A, 12B, and 12C illustrate a changing of a color of a figure.
Figure 12A:
Figure 12B:
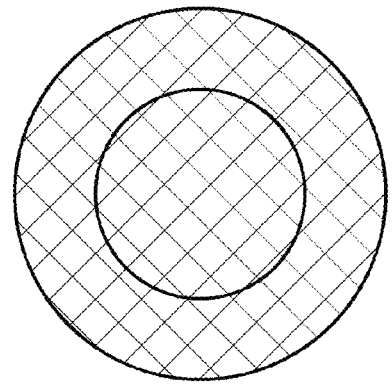
Figure 12B:
Figure 12C:
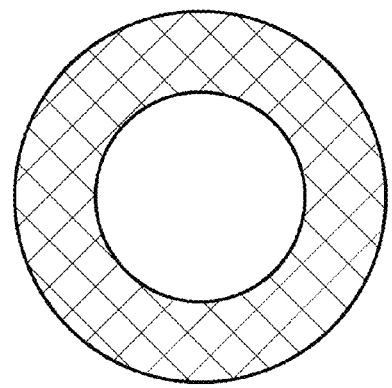

A target color for comparison may be shown as the reference image I(x), and the target color for comparison and a color changed according to the difference ΔD may be used as a guidance image. For example, as illustrated in FIG. 12B, when the measured distance D is within an appropriate range, the guidance image generation unit 24 may use a circle with the target color as a guidance image. As illustrated in FIG. 12A, when the biometric authentication portion is close to the biometric sensor 11 and the measured distance D is small, the guidance image generation unit 24 may add the target color to a circumference portion of a circle, may add a deep color according to the difference ΔD to a center portion of the circle, and may use the circle as the guidance image. As illustrated in FIG. 12C, when the biometric authentication portion is far from the biometric sensor 11 and the measured distance D is large, the guidance image generation unit 24 may add the target color to the circumference portion of the circle, may add a light color according to the difference ΔD to the center portion of the circle, and may use the circle as the guidance image. In this case, the user is capable of naturally adjusting the position of the biometric authentication portion like focusing a point. That is, the intuitive guidance of the biometric authentication portion can be achieved.

In a case of a monochrome image, the guidance images of FIG. 12A through FIG. 12C can be generated when a brightness value V (0 to 255) of the center portion of the guidance image is changed in accordance with the difference ΔD. In a case of a color image, the guidance images can be generated when at least one of RGB is subjected to the same process.

Modified Embodiment 1-14

Figure 13A:
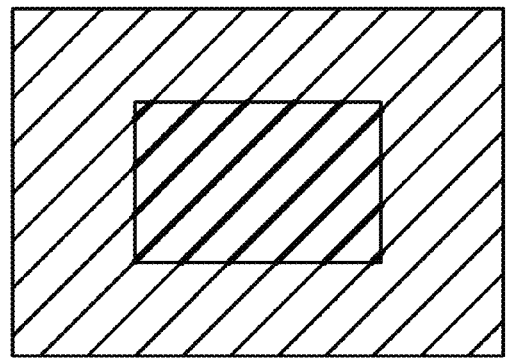
FIGS. 13A, 13B, and 13C illustrate a changing of a pattern of a figure.
Figure 13A:
Figure 13B:
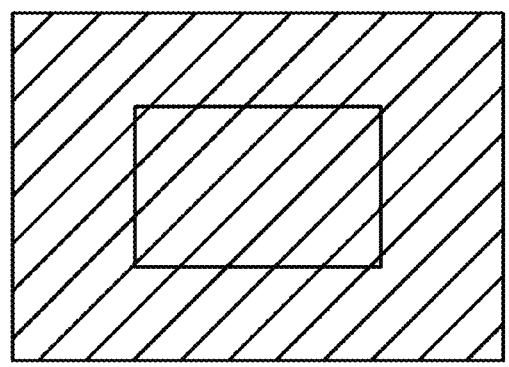
Figure 13B:
Figure 13C:
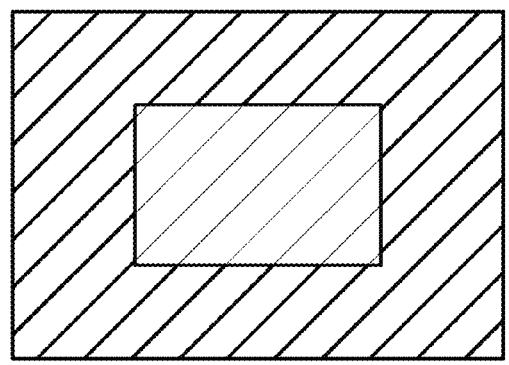

A target pattern for comparison may be shown as the reference image I(x), and the target pattern and a pattern changed according to the difference ΔD may be shown as a guidance image. For example, as illustrated in FIG. 13B, when the measured distance D is within an appropriate range, the guidance image generation unit 24 may use a square having a target pattern (hatch) for comparison as a guidance image. As illustrated in FIG. 13A, when the biometric authentication portion is close to the biometric sensor 11 and the measured distance D is small, the guidance image generation unit 24 may add the target pattern to a circumference portion of the square, may add a thick hatch to a center portion of the square according to the difference ΔD, and may use the square as the guidance image. As illustrated in FIG. 13C, when the biometric authentication portion is far from the biometric sensor 11 and the measured distance is large, the guidance image generation unit 24 adds the target pattern to the circumference portion of the square, may add a thin hatch to the center portion of the square according to the difference ΔD and may use the square as the guidance image.

In this case, the user is capable of naturally adjusting the position of the biometric authentication portion like focusing a point. That is, an intuitive guidance of the biometric authentication portion can be achieved. A dot pattern may be used instead of the hatch, and a size of the dot may be changed according to the difference ΔD.

Modified Embodiment 1-15

The guidance image generation unit 24 may add an arrow image to each of the above-mentioned guidance images. For example, the storage unit 25 stores two types of arrows including an upward arrow and a downward arrow. When the biometric authentication portion is close to the biometric sensor 11, the guidance image generation unit 24 may add an upward arrow to the guidance image. On the other hand, when the biometric authentication portion is far from the biometric sensor 11, the guidance image generation unit 24 may add a downward arrow to the guidance image. In this way, the user is capable of intuitively guiding the measured distance D to an appropriate range.

Information that helps understanding of the position of a biometric authentication portion other than the arrow image may be added to a guidance image. For example, when visual information such as "Place your palm closer to the sensor" or "Place your palm away from the sensor" is added to a guidance image, the user is capable of guiding a biometric authentication portion to an appropriate range.

Modified Embodiment 1-16

The guidance image generation unit 24 may generate a plurality of guidance images of which reference I(x) is changed in stages in advance, and the storage unit 25 may store the guidance images. In this case, the guidance image generation unit 24 selects an image according to the difference ΔD from the plurality of images stored in the storage unit 25.

Figure 14A:
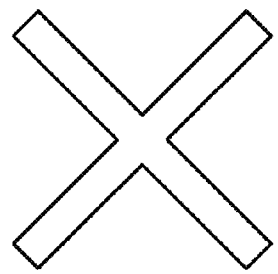
FIGS. 14A, 14B, and 14C illustrate a changing of a figure.
Figure 14B:
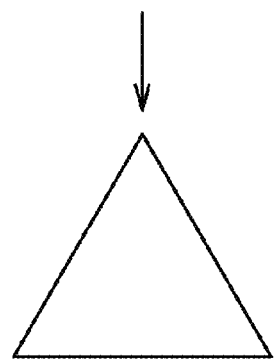
Figure 14C:
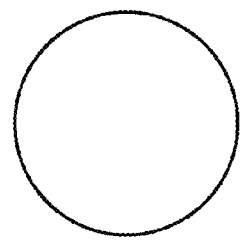

For example, as illustrated in FIG. 14C, when the measured distance D is within an appropriate range, the guidance image generation unit 24 may use the reference image I(x) as a guidance image. It is preferable that the reference image I(x) is a circle so that a user intuitively understands that the measured distance D is within an appropriate range. As illustrated in FIG. 14B and FIG. 14C, when the measured distance D is off the appropriate range, the guidance image generation unit 24 generates a guidance image that is different from the reference image I(x). It is preferable that the guidance image is an image such as a triangle or an X mark so that the user intuitively understands that the measured distance D is off the appropriate range.

An image of an opened flower may be used as the reference image I(x). When the biometric authentication portion is far from the biometric sensor 11, an image of a closed flower may be used as a guidance image. When the biometric authentication portion is close to the biometric sensor 11, an image of a dead flower may be used as the guidance image. An image of a glass filled with an appropriate amount of beer may be used as the reference image I(x). In this case, when the biometric authentication portion is far from the biometric sensor 11, an image of a glass filled with a small amount of beer may be used as a guidance image. When the biometric authentication portion is close to the biometric sensor 11, an image of a glass from which beer overflows may be used as the guidance image. An image of a grilled meat ready to eat may be used as the reference image I(x). In this case, when the biometric authentication portion is far from the biometric sensor 11, an image of raw meat may be used as a guidance image. When the biometric authentication portion is close to the biometric sensor 11, an image of black-burnt meat may be used as the guidance image. An image of a given value may be used as the reference image I(x), and another value may be used as a guidance image.

Modified Embodiment 1-17

The guidance image generation unit 24 may section an assumed difference ΔD into a plurality of ranges, may relate the ranges to the changing amount of the reference image I(x), and may store a plurality of guidance images in the storage unit 25. In concrete, a range related to a large difference ΔD may be related to a guidance image related to a large changing amount. A range related to a small difference ΔD may be related to a guidance image related a small changing amount.

Modified Embodiment 1-18

The guidance image generation process may be performed when the biometric authentication program is executed, at a login or at a starting. And, in accordance with the process time, it may be determined whether the guidance image generation unit 24 generates a guidance image or whether guidance images stored in the storage unit 25 in advance are used. A calculation for the check has only to be performed once. A result of the calculation for the check may be stored in the storage unit 25, and the value may be referenced in the second or subsequent times. In this way, the number of performance of the calculation for check can be reduced.

Figure 15:
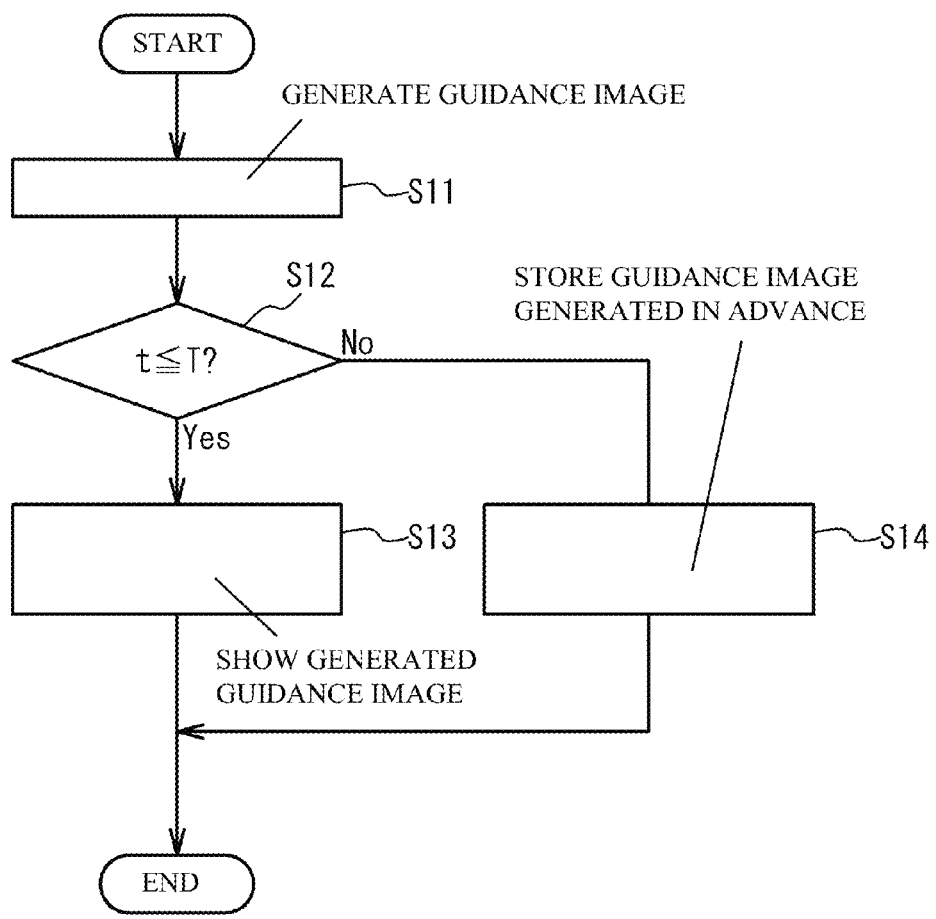
FIG. 15 illustrates an example of a flowchart executed during checking a performance.

A description will be given of a check method of processing ability and a performance method after the check method, with reference to FIG. 15. As illustrated in FIG. 15, the guidance image generation unit 24 generates a guidance image (Step S11). Next, the guidance control unit 22 determines whether a time "t" for generating the guidance image in the Step S11 is less or equal to the update time interval T stored in the storage unit 25 in advance (Step S12). The update time interval T is a response time that is necessary for a user. If it is determined as "Yes" in the Step S12, the guidance control unit 22 makes the display 30 show the guidance image generated by the guidance image generation unit 24 (Step S13). If it is determined as "No" in the Step S13, the guidance image generation unit 24 generates a guidance image in advance and stores the guidance image in the storage unit 25 (Step S14).

When a total distance $D_R$ for guidance ($D_R$=18 cm if the guidance is performed in a range of 2 cm to 20 cm) and a rounded distance "d" are used, a total number N of necessary guidance images is N=$D_R$/d. When the storage unit 25 is capable of storing the N sheets of the guidance images, all of the guidance images are generated in advance and the storage unit 25 stores the guidance images.

On the other hand, when the storage unit 25 is capable of only N' (<N) sheets of guidance images because of capacity limit, the storage unit 25 stores the N' sheets of guidance images and the rest may be pseudoly generated in accordance with the formulas (5), (6) and (7). The update time interval T may be set in advance when shipping, and may be changed by a user.

Second Embodiment

Figure 16:
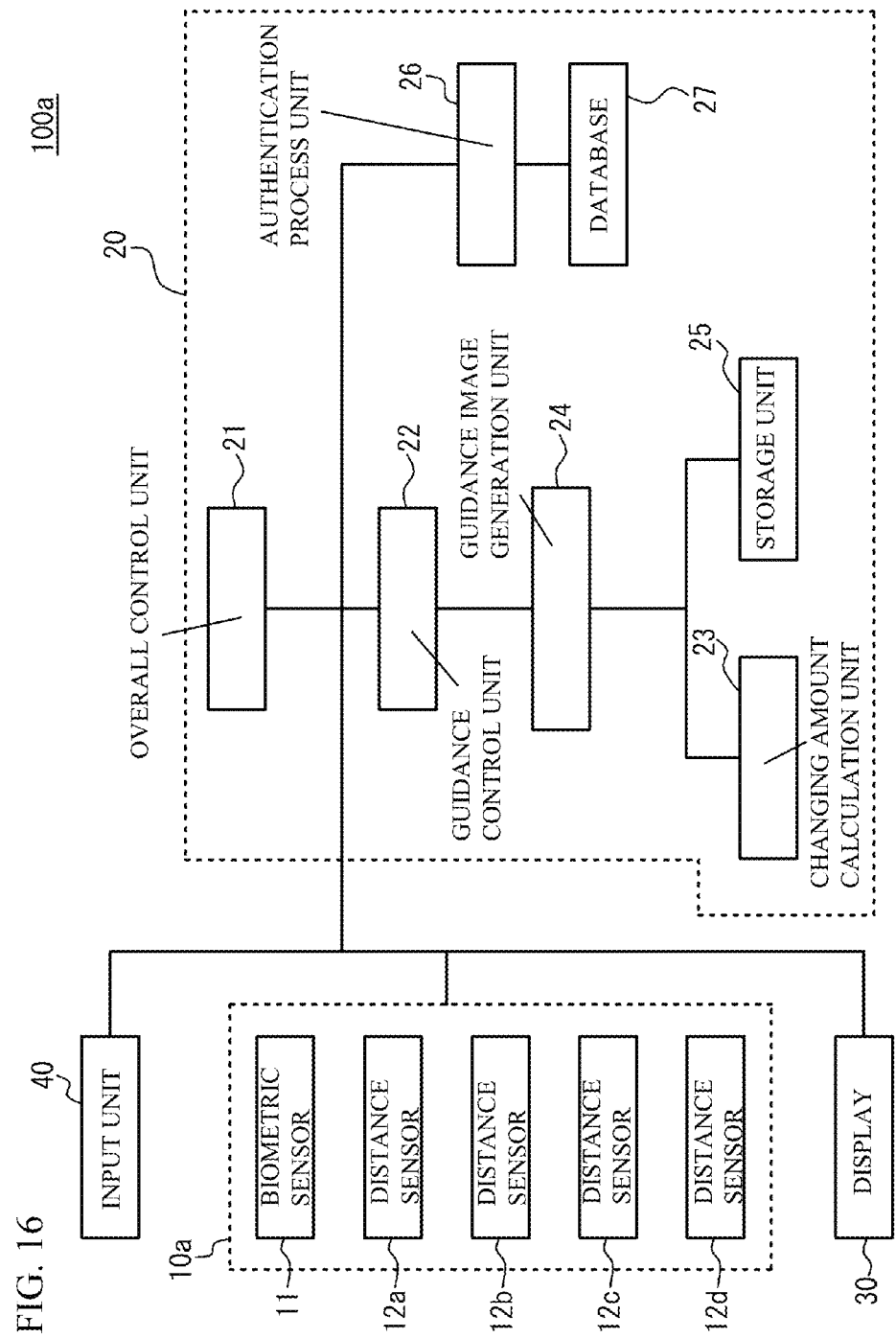
FIG. 16 illustrates a function block diagram for describing an overall structure of a biometric authentication device in accordance with a second embodiment.

FIG. 16 illustrates a function block diagram for describing an overall structure of a biometric authentication device 100a in accordance with a second embodiment. The biometric authentication device 100a is different from the biometric authentication device 100 of FIG. 1 in a point that an authentication sensor 10a is provided instead of the authentication sensor 10. The authentication sensor 10a is different from the authentication sensor 10 in a point that a plurality of distance sensors are provided. In the embodiment, four distance sensors 12a through 12d are provided.

Figure 17A:
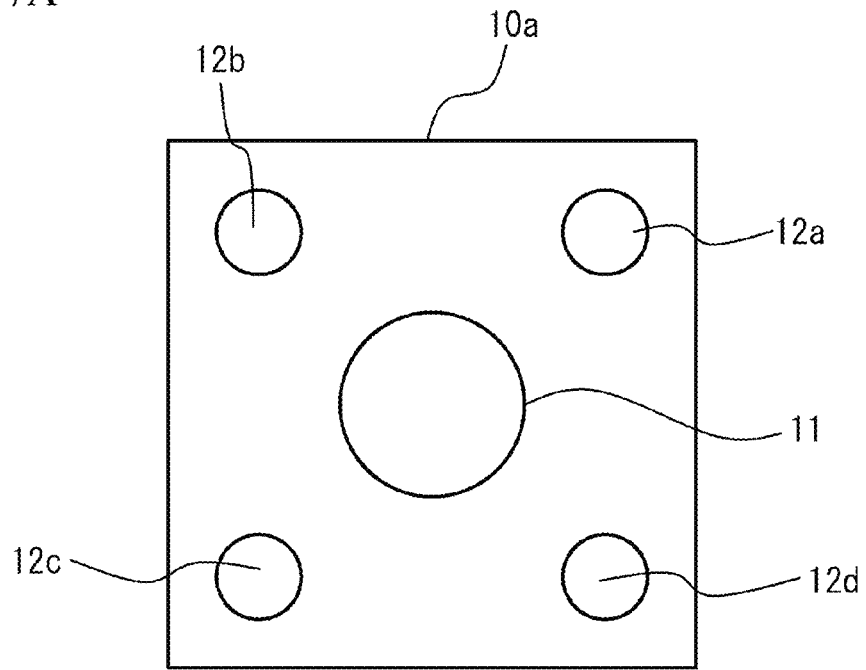
FIGS. 17A and 17B illustrate a schematic plane view of the authentication sensor.

FIG. 17A illustrates a schematic plane view of the authentication sensor 10a. As an example, a face of a sensor portion of the authentication sensor 10a has a rectangular shape. As illustrated in FIG. 17A, the biometric sensor 11 is located in a center portion of the authentication sensor 10a, and the distance sensors 12a through 12d are located at each corner so as to surround the biometric sensor 11. The distance sensors 12a through 12d obtain distances (measured distance $D_a$ through $D_d$) between a biometric authentication portion and the distance sensors 12a through 12d.

Figure 17B:
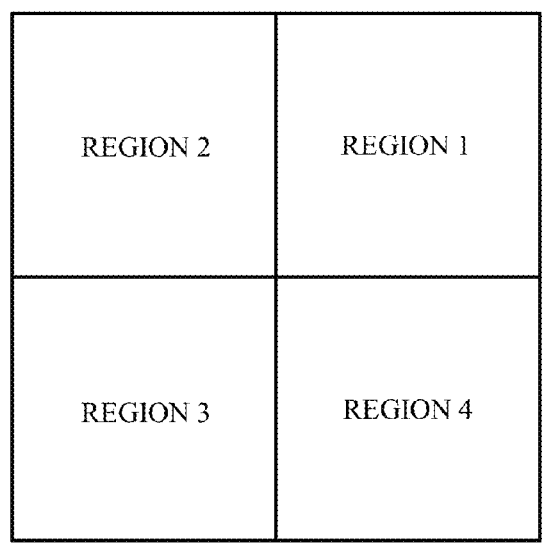

The guidance image generation unit 24 divides a guidance image by the number of the distance sensors. In the embodiment, the guidance image generation unit 24 divides the guidance image into four regions 1 through 4. FIG. 17B illustrates an example of the regions 1 through 4. The guidance image generation unit 24 performs the guidance image generation process with respect to each region. For example, the guidance image generation unit 24 performs the guidance image generation process with respect to the region 1 with use of the distance $D_a$ obtained by the distance sensor 12a.

In accordance with the embodiment, the user is capable of confirming whether a biometric authentication portion is guided to an appropriate position in each region. Therefore, an intuitive guidance of an inclination of a biometric authentication portion is achieved with respect to a user, in addition to an intuitive guidance of a distance between the biometric sensor 11 and a biometric authentication portion. Thus, authentication accuracy is improved.

Modified Embodiment 2-1

The guidance image generation unit 24 may divide a guidance image into more regions with use of the four distance sensors. Here, a formula of a three-dimension plane is expressed as a following formula (20). In the formula (20), "x", "y" and "z" indicate a coordinate value. "z" indicates a height direction. "a", "b" and "c" are a parameter indicating the plane. In the formula (20), there are three independent parameters. Therefore, the plane is determined with use of the four measured distances $D_a$ through $D_d$.

$$ax+by+cz+1=0 \quad (20)$$

Figure 18:
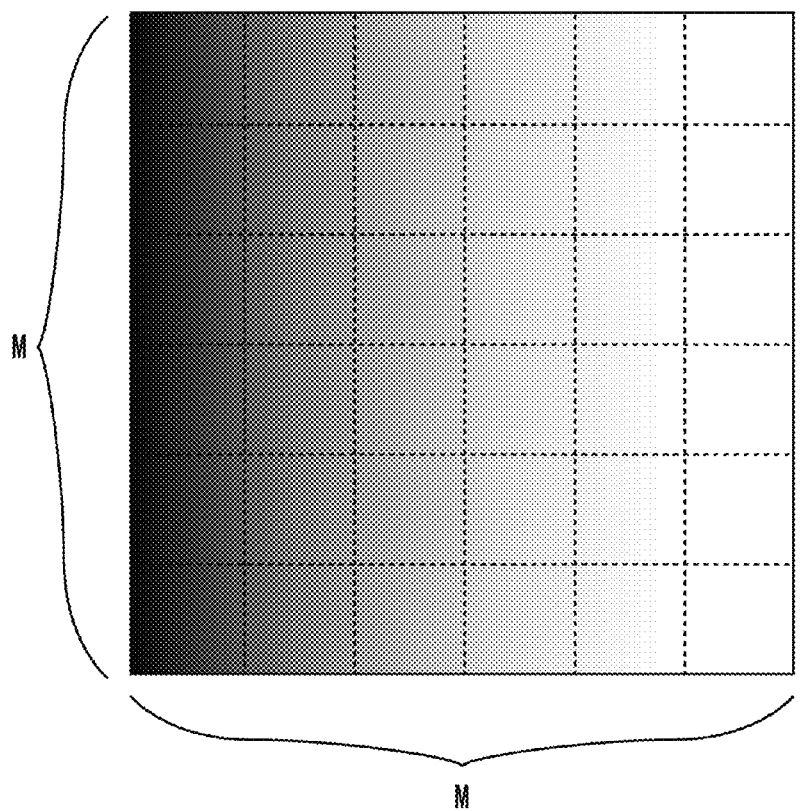
FIG. 18 illustrates an example of generation of a guidance image.

In the modified embodiment, the guidance image generation unit 24 divides a guidance image into a mesh shape M X M, calculates a distance of each region (a height of the z-direction) with use of the formula (20), and performs a blurring process with respect to each mesh region. FIG. 18 illustrates an example of generation of a guidance image in accordance with the modified embodiment. A difference $\Delta D$ of each mesh region is calculated with use of the plane calculated in accordance with the formula (20). In concrete, for example, a difference $\Delta D$ of each mesh region is determined according to a z-coordinate corresponding to a center of each mesh region and a target position. Each guidance image region corresponding to each mesh region is subjected to a blurring process with use of a blurring amount $\sigma$. Thus, a guidance image region corresponding to a mesh region having a correct distance is shown clearly. On the other hand, a guidance image region corresponding to a mesh region having an incorrect distance is shown with blurring. In accordance with the modified embodiment, an inclination of a biometric authentication portion can be confirmed in more detail. Therefore, authentication accuracy is more improved.

Modified Embodiment 2-2

The guidance image generation unit 24 may use color information. For example, the guidance image generation unit 24 separates a color image into each component of Y, Cb and Cr, and uses the method of the modified embodiment 2-2 with respect to the Y-component. The guidance image generation unit 24 may emphasize the Cr-component when the biometric authentication portion is excessively close to the biometric sensor 11, and may emphasize the Cb-component when the biometric authentication portion is excessively far from the biometric sensor 11. Thus, when the biometric authentication portion is excessively close to the biometric sensor 11, the guidance image gets red. When the biometric authentication portion is excessively far from the biometric sensor 11, the guidance image gets blue. Therefore, an intuitive guidance of a user is achieved.

Third Embodiment

Figure 19:
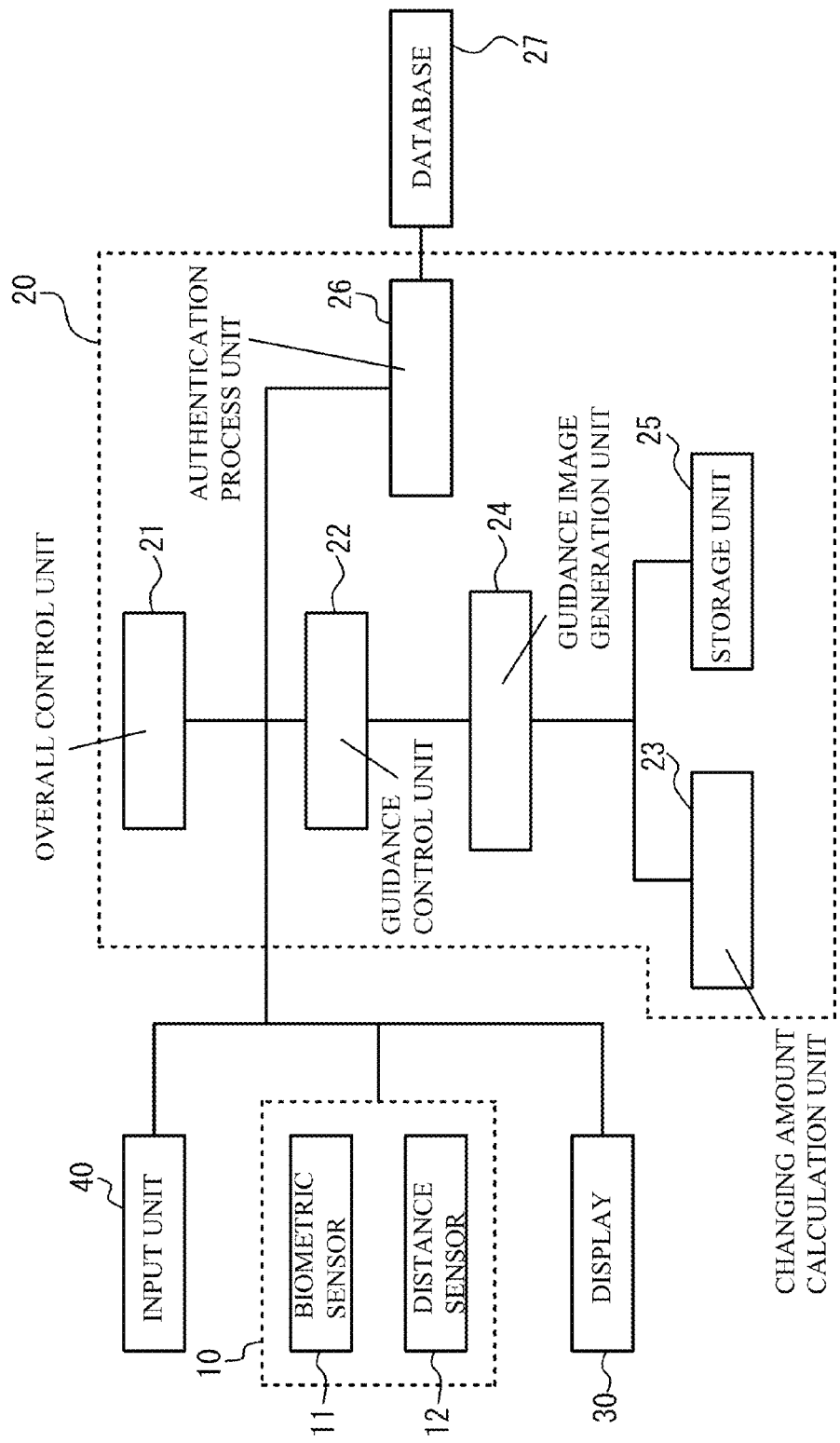
FIG. 19 illustrates a function block diagram for describing an overall structure of a biometric authentication device in accordance with a third embodiment.

FIG. 19 illustrates a function block diagram for describing an overall structure of a biometric authentication device 100b in accordance with a third embodiment. The biometric authentication device 100b is different from the biometric authentication device 100 of FIG. 1 in a point that the database 27 is provided out of the biometric authentication device 100b. The database 27 may be an external component such as an IC card of a user. In this case, the authentication process unit 26 accesses the database 27 via an input/output interface. The database 27 of the second embodiment may be provided out of the biometric authentication device.

Fourth Embodiment

Figure 20:
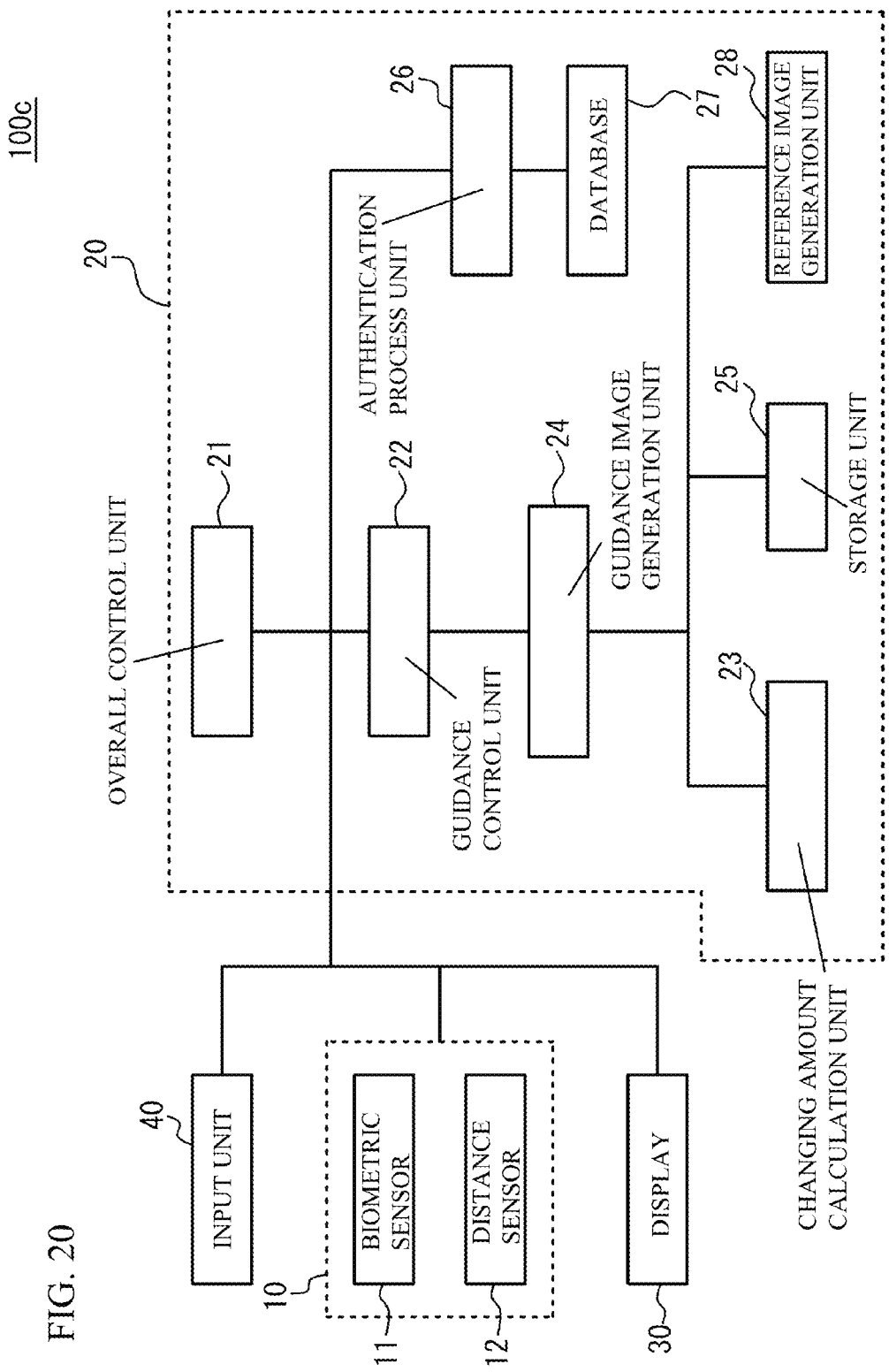
FIG. 20 illustrates a function block diagram for describing an overall structure of a biometric authentication device in accordance with a fourth embodiment.

FIG. 20 illustrates a function block diagram for describing an overall structure of a biometric authentication device 100c in accordance with a fourth embodiment. The biometric authentication device 100c is different from the biometric authentication device 100 of FIG. 1 in a point that a reference image generation unit 28 is provided. The reference image generation unit 28 generates an image such as a child, a pet, a fortune-telling or weather forecast which a user desires as the reference image I(x). For example, the user is capable of selecting a desirable guidance image via the input unit 40. The reference image generation unit 28 may generate a plurality of reference images and may switch the reference images at each authentication process in random order.

In the above-mentioned embodiments, the guidance image generation unit 24 and the display 30 act as a guidance image display unit.

Fifth Embodiment

Figure 21A:
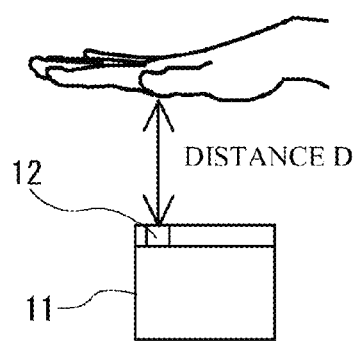
FIG. 21A and FIG. 21B illustrate X-Y directions.
Figure 21B:
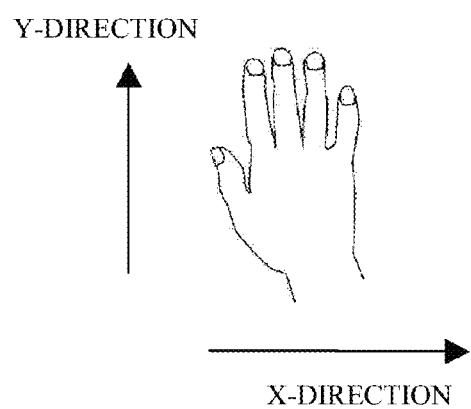

In the above-mentioned embodiments, the measured distance D is an object for guidance. A fifth embodiment discloses a structure using an image indicating guidance information in X-Y directions as a guidance image. FIG. 21A and FIG. 21B illustrate the X-Y directions. As illustrated in FIG. 21A and FIG. 21B, the X-Y directions are two directions at a right angle forming a plane in parallel with the biometric sensor 11.

In the embodiment, a biometric image for authentication is obtained during the guidance process in addition to the measured distance D, because a guidance of a position in the X-Y directions is performed in addition to the measured distance D. The position in the X-Y directions is obtained from the biometric image, and is used for the guidance. Various methods can be used as a concrete method for obtaining the position in the X-Y directions. A description will be given of a method using a center of gravity as an example. First, the biometric image is subjected to a binarization with use of a given threshold. A center of gravity (MX, MY) of a region obtained through the binarization is calculated, and the center of gravity is used as the position in the X-Y directions.

For example, when the center of gravity (MX, MY) is in a given region of a center portion of the image, it can be determined that the guidance of the X-Y directions is not needed. On the other hand, when "MX" is off a predetermined range, a user is guided in the X-direction. When "MY" is off a predetermined range, the user is guided in the Y-direction.

Other than the center of gravity, a matching process of a registered image may be performed, and a position may be obtained from a result of the matching process. In this case, a process time gets longer compared to a simple method using the center of gravity. However, a position can be obtained with higher accuracy.

A method using an arrow image may be used as the guidance method using the X-Y directions. That is, an arrow image indicating the X-Y directions for movement of a user is generated, and is used as a guidance image. Alternatively, arrow images for guidance corresponding to the X-Y directions for guidance may be prepared in advance, and may be used arbitrarily. Other than the arrow, an image of an object for authentication (for example a hand) of which position is shift may be schematically shown as the guidance image of the X-Y directions.

The guidance image is subjected to a blurring process in accordance with the measured distance D as well as the first embodiment, and the guidance of the measured distance D is performed. That is, the movement in the X-Y directions is guided in accordance with the contents of the image, and the measured distance D is guided in accordance with the blurring process. In the guidance of the X-Y directions, a direction is intuitively indicated with use of an arrow image or the like. On the other hand, in the guidance of the measured distance D, an intuitive guidance process for a user can be performed by performing a blurring process on an image and applying an analogy like focusing a point.

Figure 22A:
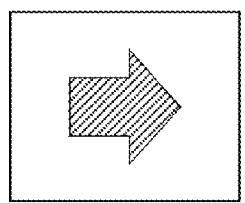
FIG. 22A through FIG. 22C illustrate an example of a guidance image in accordance with a fifth embodiment.
Figure 22B:
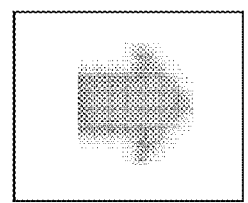
Figure 22C:
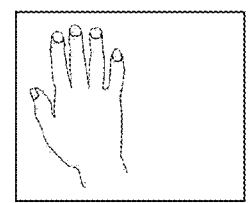

FIG. 22A through FIG. 22C illustrate an example of a guidance image in accordance with the embodiment. FIG. 22A illustrates a guidance image in a case where the measured distance D is within an appropriate range and "MX" is off an appropriate range toward a minus side of the X-direction. In this case, as illustrated in FIG. 22A, an arrow looking toward a plus direction of the X-direction without blurring may be shown as a guidance image. When the guidance image of FIG. 22A is used, the authentication portion of a user can be guided toward the plus side in the X-direction without changing of the measured distance D.

FIG. 22B illustrates an example of a guidance image in a case where the measured distance D is off an appropriate range and "MX" is off an appropriate range toward a minus side in the X-direction. In this case, as illustrated in FIG. 22B, an arrow looking toward the plus side in the X-direction subjected to a blurring process may be shown as a guidance image. When the guidance image of FIG. 22B is used, a distance between the authentication portion of the user and the biometric sensor 11 can be guided to an appropriate range and the authentication portion of the user can be guided toward the plus side in the X-direction.

FIG. 22C illustrates an example of a guidance image in case where the measured distance D is within an appropriate range and "MX" is off an appropriate range toward a minus side in the X-direction. In this case, as illustrated in FIG. 22C, an image of an authentication portion shifted toward the minus side in the X-direction without blurring process may be shown as a guidance image. When the guidance image of FIG. 22C is used, the authentication portion of the user can be guided toward the plus side in the X-direction without changing of the measured distance D.

Figure 23:
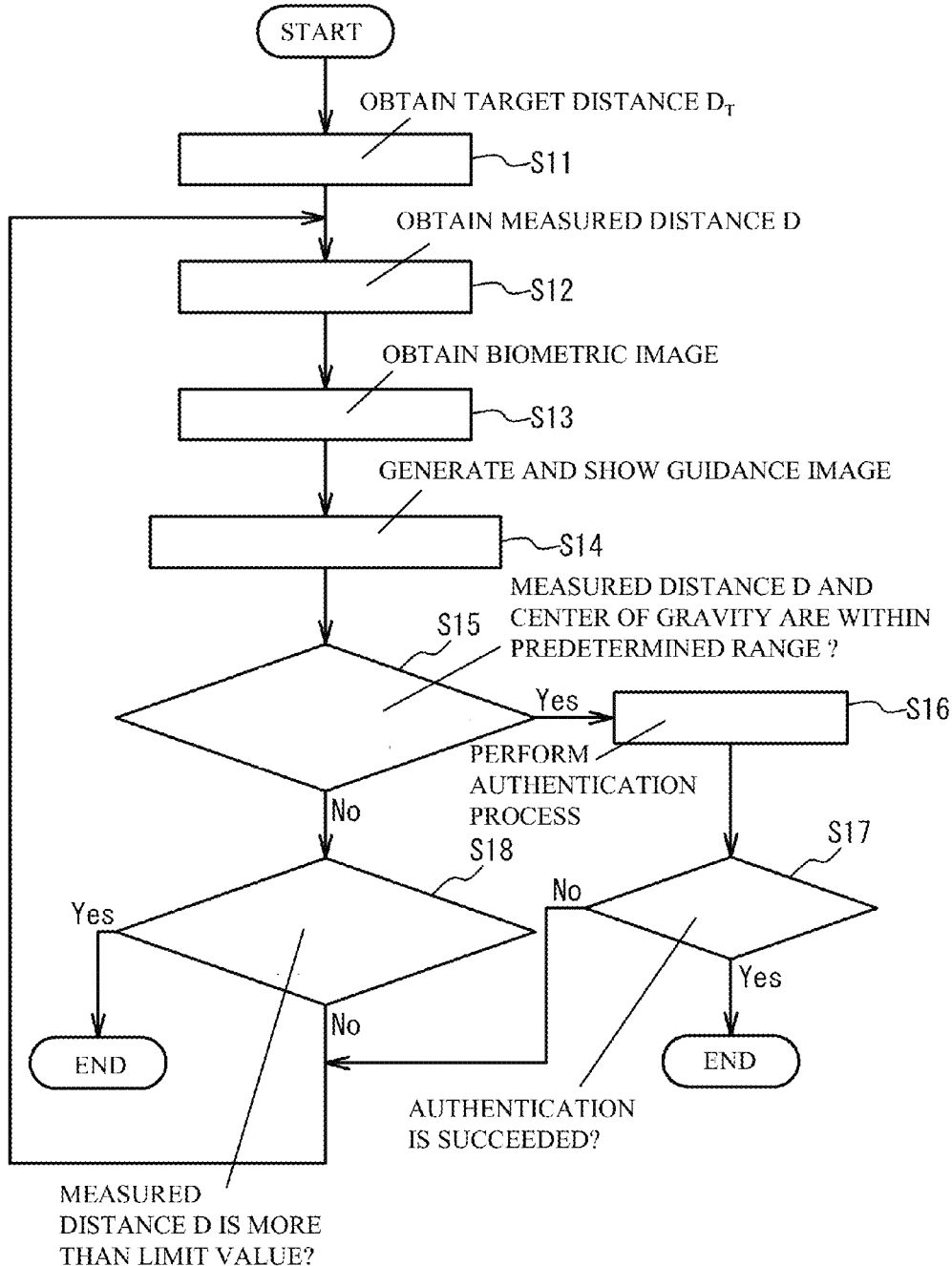
FIG. 23 illustrates an example of a flowchart in accordance with the fifth embodiment.

FIG. 23 illustrates an example of a flowchart in accordance with the embodiment. The overall control unit 21 controls each component in accordance with the flowchart of FIG. 23. First, the changing amount calculation unit 23 obtains a target distance $D_T$ from the storage unit 25 (Step S11). Next, the changing amount calculation unit 23 receives a detection result from the distance sensor 12 and obtains a measured distance D (Step S12).

Next, the biometric sensor 11 obtains a biometric image of a user (Step S13). Next, the guidance image generation unit 24 calculates a center of gravity (MX, MY) of an authentication portion based on the biometric image and selects a reference image I(x) indicating a guidance direction of the authentication portion. The changing amount calculation unit 23 calculates a changing amount according to a difference ΔD (=D-DT). The guidance image generation unit 24 generates a guidance image F(x) by performing a blurring process on the reference image I(x) in accordance with the changing amount calculated by the changing amount calculation unit 23. Thus, the display 30 shows the guidance image F(x) (Step S14).

Next, the guidance control unit 22 determines whether the measured distance D and the center of gravity (MX, MY) are within an allowable range (Step S15). If it is determined as "Yes" in the Step S15, the authentication process unit 26 performs an authentication process (Step S16). Next, the authentication process unit 26 determines whether the authentication is succeeded (Step S17). If it is determined as "No" in the Step S17, the Steps S12 through S15 are executed again. If it is determined as "Yes" in the Step S17, the flowchart is terminated.

If it is determined as "No" in the Step S15, the changing amount calculation unit 23 determines whether the measured distance D is more than a limit value (Step S18). The limit value is a value for determining whether the user stops laying his or her palm. The limit value may be a detection limit of the distance sensor 12 or may be a given threshold. If it is determined as "Yes" in the Step S18, the flowchart is terminated. Thus, unnecessary control is not performed. If it is determined as "No" in the Step S18, the Steps S12 through S15 are executed again.

In accordance with the embodiment, a guidance in the X-Y directions can be easily performed in addition to a distance. Thus, it is possible to provide a biometric authentication device that is easily understandable and having high authentication accuracy.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A biometric authentication device comprising:
   a biometric sensor that obtains an image of a biometric authentication portion of a user without contacting;
   a distance sensor that obtains a distance between the biometric sensor and the biometric authentication portion;
   a memory; and
   a processor configured to generate a guidance image for guiding the biometric authentication portion to a distance that is appropriate for the biometric sensor to obtain the biometric authentication portion by changing a reference image based on the distance obtained by the distance sensor by performing a blurring process on the reference image with use of a convolution theorem and to show the guidance image on a display, the guidance image changing continuously or in stages according to the distance obtained by the distance sensor.

2. The biometric authentication device as claimed in claim 1, wherein the processor is configured to generate the guidance image by performing the process of changing the reference image based on a difference between the distance obtained by the distance sensor and a target distance determined in advance.

3. The biometric authentication device as claimed in claim 1, wherein a changing amount of the reference image when the biometric authentication portion is closer than the target distance is different from that of the reference image when the biometric authentication portion is farther than the target distance.

4. The biometric authentication device as claimed in claim 1, wherein the processor is configured to separate the guidance image into a brightness component and a color component and to change only the brightness component of the reference image.

5. The biometric authentication device as claimed in claim 1 further comprising a storage unit configured to store a plurality of images generated by changing the reference image in stages,
wherein the processor is configured to select one of the plurality of images stored in the storage unit as the guidance image based on the distance obtained by the distance sensor.

6. The biometric authentication device as claimed in claim 5, wherein the processor is configured to relate the distance obtained by the distance sensor with a changing amount of the reference image and to select one of the plurality of images stored in the storage unit as the guidance image.

7. The biometric authentication device as claimed in claim 1, wherein:
the distance sensor obtains a plurality of distances between the biometric sensor and a plurality of portions of the biometric authentication portion; and
the processor is configured to divide the guidance image into a plurality of small regions related to the plurality of portions of the biometric authentication portion and to show guidance image with respect to each small region based on each distance obtained by the distance sensor.

8. The biometric authentication device as claimed in claim 1, wherein the processor is configured to make the guidance image include a comparative image that is fixed regardless of the distance obtained by the distance sensor.

9. The biometric authentication device as claimed in claim 1, wherein the biometric sensor obtains an image of the biometric authentication portion when the distance obtained by the distance sensor is within an appropriate range.

10. A computer readable, non-transitory medium storing a program that causes a computer to execute a process, the process comprising:
obtaining a distance between a biometric sensor obtaining an image of a biometric authentication portion of a user without contacting and the biometric authentication portion; and
generating a guidance image for guiding the biometric authentication portion to a distance that is appropriate for the biometric sensor to obtain the biometric authentication portion by changing a reference image based on the distance obtained by the distance sensor by performing a blurring process on the reference image with use of a convolution theorem and showing the guidance image on a display, the guidance image changing continuously or in stages according to the distance obtained by the distance sensor.

11. The medium as claimed in claim 10, wherein the guidance image is generated by performing the process of changing the reference image based on a difference between the distance obtained by the distance sensor and a target distance determined in advance.

12. The medium as claimed in claim 10, wherein a changing amount of the reference image when the biometric authentication portion is closer than the target distance is different from that of the reference image when the biometric authentication portion is farther than the target distance.

13. The medium as claimed in claim 10, wherein the guidance image is separated into a brightness component and a color component and only the brightness component of the reference image is changed.

14. The medium as claimed in claim 10, wherein:
the process comprises storing a plurality of images generated by changing the reference image in stages in a storage unit; and
one of the plurality of images stored in the storage unit is selected as the guidance image based on the distance obtained by the distance sensor.

* * * * *